United States Patent
Maitland et al.

(10) Patent No.: US 8,327,116 B1
(45) Date of Patent: Dec. 4, 2012

(54) SYSTEM AND METHOD FOR PROCESSING MULTIPLE TYPES OF DATA FRAMES

(75) Inventors: Roger Maitland, Woodlawn (CA); Eric Combes, Boisbriand (CA)

(73) Assignee: Alcatel Lucent, Paris (FR)

( * ) Notice: Subject to any disclaimer, the term of this patent is extended or adjusted under 35 U.S.C. 154(b) by 1515 days.

(21) Appl. No.: 10/728,807

(22) Filed: Dec. 8, 2003

(51) Int. Cl.
*G06F 15/00* (2006.01)

(52) U.S. Cl. .......................................... 712/26

(58) Field of Classification Search .................. 712/29, 712/248, 36, 225
See application file for complete search history.

(56) References Cited

U.S. PATENT DOCUMENTS

| | | | | |
|---|---|---|---|---|
| 4,656,626 | A * | 4/1987 | Yudichak et al. | 370/374 |
| 5,509,121 | A * | 4/1996 | Nakata et al. | 709/230 |
| 6,223,320 | B1 | 4/2001 | Dubey et al. | 714/757 |
| 6,289,008 | B1 * | 9/2001 | Sakamoto et al. | 370/331 |
| 6,308,281 | B1 * | 10/2001 | Hall et al. | 714/4 |
| 6,505,979 | B2 * | 1/2003 | Twist et al. | 396/625 |
| 6,535,979 | B1 * | 3/2003 | Vialen et al. | 713/163 |
| 6,639,915 | B1 * | 10/2003 | Tsztoo et al. | 370/392 |
| 6,658,010 | B1 * | 12/2003 | Enns et al. | 370/401 |
| 6,661,791 | B1 * | 12/2003 | Brown | 370/392 |
| 6,788,710 | B1 * | 9/2004 | Knutson et al. | 370/535 |
| 2002/0012328 | A1 * | 1/2002 | Emanuel et al. | 370/328 |
| 2003/0012209 | A1 * | 1/2003 | Abdelilah et al. | 370/412 |

OTHER PUBLICATIONS simdtech.org/altivec SIMD tech; AltiVec Technology, copyright © 2003 SIMD.
freescale.com/webapp/sps/site/overview.jsp?nodeId=018rH3bTdGmKqW5Nf2 freescale semiconductor; AltiVec™, Oct. 6, 2004, p. 1-3.
Freescale Semiconductor, Inc.; Isn'T It Time You Got Faster, Quicker?, AltiVec™ Technology At-a-Glance.
Joshi, Sanjay M., et al.; A New Parallel Algorithm for CRC Generation; IEEE, 2000, pp. 1764-1768.
Williams, Ross N.; A Painless Guide to CRC Error Detection Algorithms, RocksoftAtm Pty Ltd., Aug. 19, 1993.

* cited by examiner

*Primary Examiner* — Eddie P Chan
*Assistant Examiner* — John Lindlof
(74) *Attorney, Agent, or Firm* — Sughrue Mion, PLLC

(57) ABSTRACT

An off-load for processing a data frame containing information has a memory for storing information on a plurality of processing paths. A processor in the off-load engine determines which processing path the data frame is to be processed. Each one of a plurality of processing engines processes the data frame depending on whether the processing engine is within the determined processing path. Some of the processing engines are implemented in hardware and/or data frame type specific software and others makes use of generic software. In some embodiments, the data frame is also parsed for further processing by the processing engines. In some embodiments, a static header is also pre-pended to the data frame to allow easy access to information associated with the data frame by the processing engines.

3 Claims, 20 Drawing Sheets

| BITS | | | | | | | | NUMBER OF OCTETS | |
|---|---|---|---|---|---|---|---|---|---|
| 7 | 6 | 5 | 4 | 3 | 2 | 1 | 0 | | |
| HEADER CRC  440 | | | | | | FT  480 | | 1 | HEADER 410 |
| CFN  450 | | | | | | | | 1 | |
| SPARE | | | TFI OF FIRST DCH  460 | | | | | 0-n | |
| ... | | | | | | | | | |
| SPARE | | | TFI OF LAST DCH  460 | | | | | | |
| FIRST TB OF FIRST DCH  470 | | | | | | | | 0-n | PAYLOAD 420 |
| ... | | | | | | | | | |
| FIRST TB OF FIRST DCH (CONT.)  470 | | | | | PADDING  570 | | | | |
| ... | | | | | | | | 0-n | |
| LAST TB OF FIRST DCH  470 | | | | | | | | | |
| ... | | | | | | | | 0-n | |
| FIRST TB OF FIRST DCH (CONT.)  470 | | | | | PADDING  570 | | | | |
| ... | | | | | | | | 0-n | |
| LAST TB OF FIRST DCH  470 | | | | | | | | | |
| ... | | | | | | | | 0-n | |
| FIRST TB OF LAST DCH (CONT.)  470 | | | | | PADDING  570 | | | | |
| ... | | | | | | | | 0-n | |
| LAST TB OF LAST DCH  470 | | | | | | | | | |
| ... | | | | | | | | 0-n | |
| FIRST TB OF LAST DCH (CONT.)  470 | | | | | PADDING  570 | | | | |
| QE  500 | | | | | | | | 1 | |
| | | | | | | | | 0-n | |
| ... | | | | | | | | | |
| | | | | | | PADDING  570 | | | |
| SPARE EXTENSION  510 | | | | | | | | 0-2 | |
| PAYLOAD CHECKSUM  520 | | | | | | | | 2 (OPTIONAL) | |
| PAYLOAD CHECKSUM (CONT.)  520 | | | | | | | | | |

CRCI OF FIRST TB OF FIRST DCH 490

CRCI OF LAST TB OF FIRST DCH 490

FIG. 7
*(PRIOR ART)*

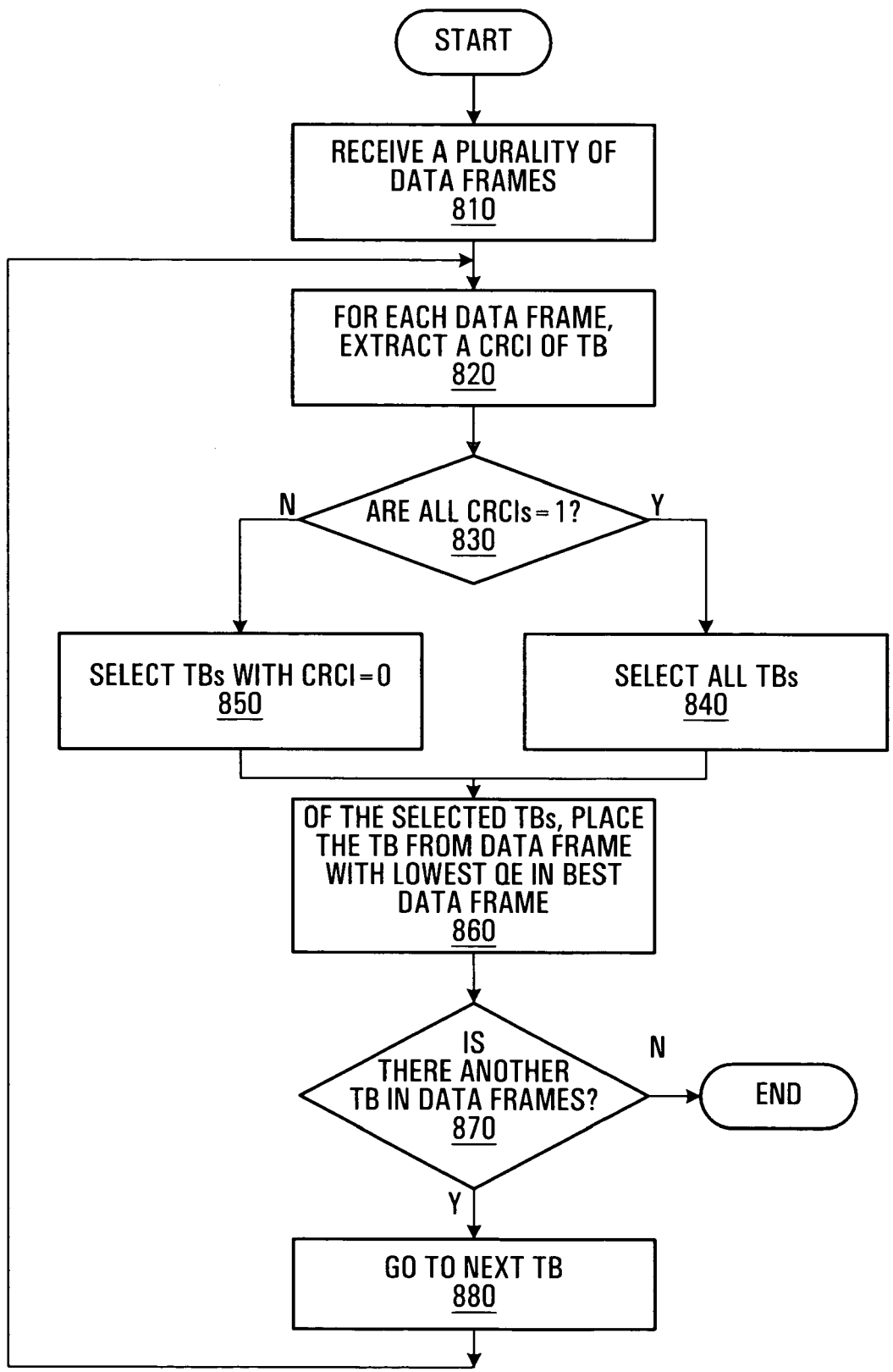
FIG. 9 *(PRIOR ART)*

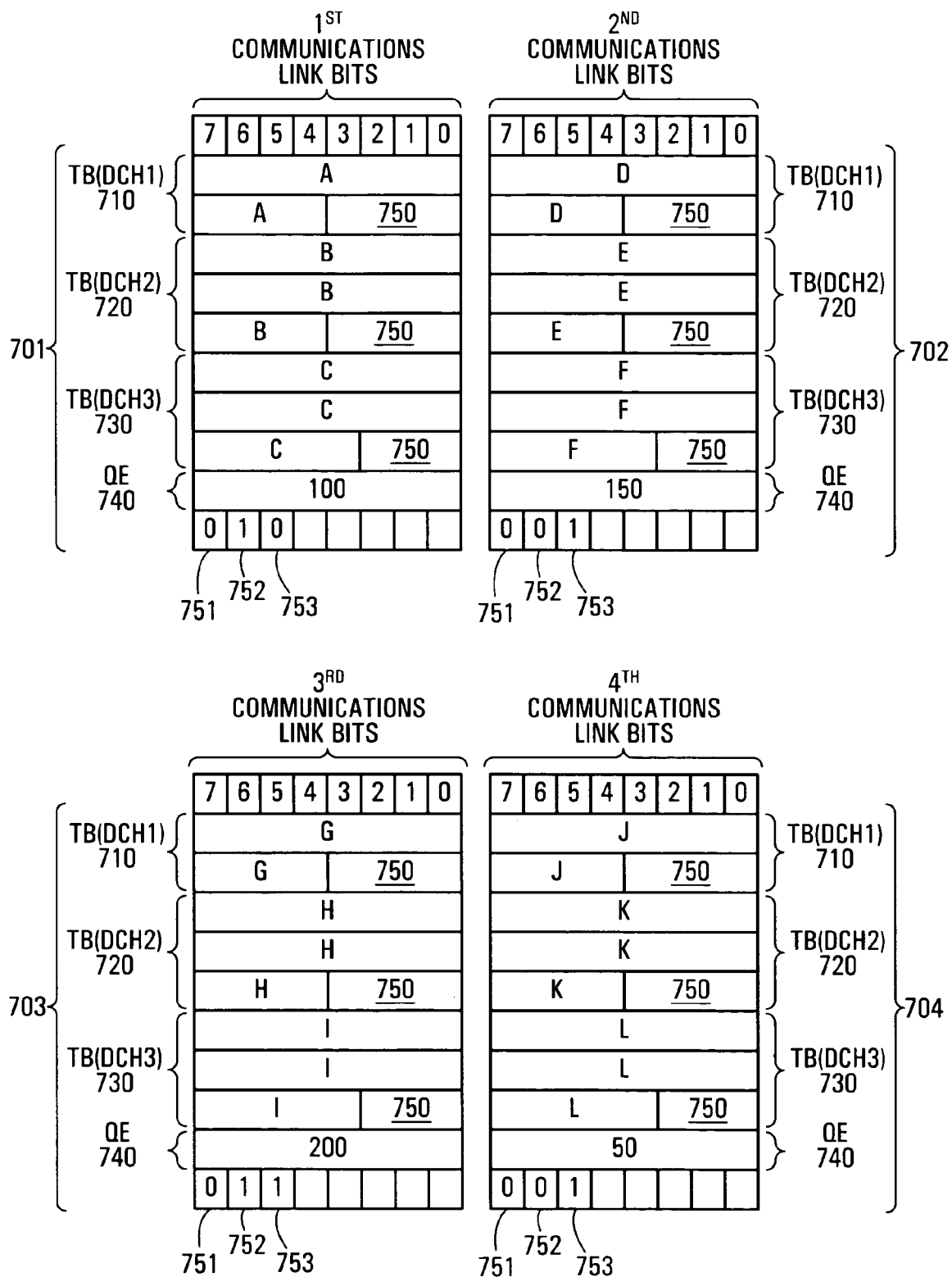
FIG. 10A *(PRIOR ART)*

| CRCI (1011) | QE (1031) | DATA FRAME NUMBER (1041) |
|---|---|---|
| | | |
| 1021 → 1 | 100 | 1 |
| 1022 → 0 | 150 | 2 |
| 1023 → 1 | 200 | 3 |
| 1024 → 0 | 50 | 4 |
| 1050 → 15 | 14 13 12 11 10 9 8 7 | 6 5 4 3 2 1 0 |
| 1061 → 1 | 0 1 1 0 0 1 0 0 | 0 0 0 0 0 0 1 |
| 1062 → 0 | 1 0 0 1 0 1 1 0 | 0 0 0 0 0 1 0 |
| 1063 → 1 | 1 1 0 0 1 0 0 0 | 0 0 0 0 0 1 1 |
| 1064 → 0 | 0 0 1 1 1 0 1 0 | 0 0 0 0 1 0 0 |
| MINIMUM 1070 → 0 | 0 0 1 1 0 0 1 0 | 0 0 0 0 1 0 0 |
| FILTER 1080 → | | 4 |

FIG. 11B

SYSTEM AND METHOD FOR PROCESSING MULTIPLE TYPES OF DATA FRAMES

RELATED APPLICATIONS

This Application contains subject matter which is related to co-pending U.S. patent application Ser. No. 10/728,874 filed on the same day as this Application and co-pending U.S. patent application Ser. No. 10/728,875 on the same day as this Application.

FIELD OF THE INVENTION

The invention relates to processing of multiple types of data frames as part of data traffic, for example UMTS (Universal Mobile Telecommunications System) traffic.

BACKGROUND OF THE INVENTION

UMTS (Universal Mobile Telecommunications System) defines standard interfaces between network nodes in order to aid interoperability between nodes from many vendors. Referring to FIG. 1, shown is a block diagram of a conventional UMTS network generally indicated by 5. In FIG. 1, a Radio Network Controller (RNC) 10 (two shown) forms part of the network 5. The RNC 10 is specified by three primary interfaces, Iub, Iur and Iu. Iub links 20 connect node Bs 30 with the RNC 10. Iur links 22 interconnect the RNCs 10 to enable radio diversity as MSs (Mobiles Stations) move throughout the network 5. Iu links 40 carry traffic between the RNCs 10 and a UMTS core network 50. In an Iu link there are two separate link types, Iu-CS and Iu-PS. Iu-CS links carry circuit switched traffic such as voice traffic between the RNC 10 and the UMTS core network 50. Iu-PS links carry packet (data) traffic between the RNCs 10 and the UMTS core network 50.

The standards that define UMTS are specified by a 3GPP (3$^{rd}$ Generation Partnership Program) and consist of a number of releases. The UMTS standards define many different types of Frame Protocols, one for each channel type: Dedicated Transport Channel (DTCH or DCH), Forward Access CHannel (FACH), Random Access Channel (RACH), Paging Channel (PCH), etc. Of these channel types, the bulk of a frame protocol bandwidth is consumed by the DCH and such a channel is used, in most circumstances, by UE (User Equipment) 35 such as MSs for example, to connect to the network 5. Data processed at the RNC 10 is processed through several layers for both an uplink 60 and a downlink 70. For any one of the RNCs 10, the uplink 60 is defined for transmission from one of the node Bs 30 to the UMTS core network 50 through the RNC 10 and the downlink 60 is defined for transmission from the UMTS core network 50 to the node B 30 through the RNC 10.

FIG. 2 shows an example set of protocol layers implemented by the RNC 10. As shown in FIG. 2, data traffic at the RNC 10 is processed through an Iu protocol layer 80, an RLC (Radio Link Control) layer 90, a MAC (Media Access Control) layer 100, and an Iub FP (Frame Protocol) layer 110.

The Iub FP layer 110 provides formatting of data frames on the downlink 70. For the uplink 60, the Iub FP layer 110 handles for example DHO (Diversity Hand-Off), payload integrity, and parsing.

In the network 5, the UE 35 transmit traffic of any type on a shared medium and a procedure must be invoked to distribute packet transmission among all users. This procedure is known as a MAC protocol. The MAC layer 100 is responsible for mapping logical channels into physical channels. The MAC layer 100 is also used for priority handling of the UE 35 and data flow of the UE 35, traffic monitoring, ciphering, multiplexing, etc. In UMTS W-CDMA (Wideband-Code Division Multiple Access), there are several packet transmission mechanisms possible according to packet size, priority level, quality of service, frequency of occurrence etc. In addition, UMTS effectively supports a wide range of services ranging from very low bit rate to very high bit rate and from constant bit rate to variable bit rate on a single connection. This is achieved using service multiplexing which allows efficient utilization of radio resources. All these issues are addressed by the MAC layer 100. The MAC layer 100 also provides ciphering (encryption) in some cases.

The RLC layer 90 is responsible for acknowledged or unacknowledged data transfer, and transparent data transfer. The RLC layer 90 is also responsible for accuracy of data sent by UE 35.

The Iu protocol layer 80 provides formatting of data frames on the uplink 60.

In conventional designs, frames being transmitted through the layers 80, 90, 100, 110 are processed through the same processing path using software. Software is used because the UMTS standards define many different types of frame protocols for each channel type, and each channel type is processed differently. With the use of software at the RNC 10 data frames of different types are processed in a single processing path; however, the use of such generic software requires extensive CPU resources at the RNC 10 especially when there is a large number of users. As such, processing data frames in a single processing path using currently available software at the RNC 10 is very inefficient and imposes a large demand on CPU usage. In addition, in UMTS typically the bulk of a frame protocol bandwidth is consumed by the DCH. Processing of data of a single type could be done using mostly hardware; however, in UMTS since different types of frame protocols are used, the data associated with the DCH, which form the bulk of the frame protocol bandwidth, is processed using software and this further compromises efficiency at the RNC 10.

Another problem with current software implementations for processing data frames is in DHO (Diversity Hand-Off). In some cases, for the uplink 60 the RNC 10 receives data frames which originate, for example, from one of MSs as UE 35 but which flow through different paths in the network 5 and are received at the RNC 10 from different node Bs 30. The data frames are collected and a combined data frame often referred to as a best data frame is obtained from the collected data frames. This process is referred to as DHO and is handled by the Iub FP layer 110 using software in order to deal with the different frame protocols. The processing in software once again compromises the efficiency of the RNC 10 in processing data traffic.

Yet another problem with current software implementations for processing data frames is in scheduling processing of the data frames. For example, in DHO data frames are combined into a combined data frame and for such a procedure to work, the procedure must be scheduled in a manner which allows sufficient time to be given for the arrival of several data frames before they can be combined. Current implementations make use of software based timers implemented on a general purpose operating system. Such implementations impose strict real time requirements on the system running the software and requires management of sophisticated timing systems. As such, one particular limitation is that the current implementations have a low capacity. In addition, the current implementations are also expensive.

SUMMARY OF THE INVENTION

An off-load engine is provided for processing data frames. For each data frame, a processing path is selected from a group of processing paths. This selection might, for example, be based on a type of the data frame. The processing paths collectively include some processing engines implemented in hardware and/or data frame type specific software, and some processing engines implemented in generic software. The data frame is then processed by the processing engines which are within the processing path in which the data frame is to be processed.

By processing the data frames in this way, each data frame is preferably processed using as many processing engines as possible implemented in hardware and/or data frame type specific software specific software to off-load some or all of the processing by the generic software. For example, in some embodiments of the invention, processing engines used for scheduling, ciphering and diversity hand-off are implemented in hardware resulting in some processing being off-loaded from software to hardware.

In accordance with a first broad aspect, the invention provides a method of processing data frames and involves determining a determined processing path of a plurality of processing paths in which the data frame is to be processed. The plurality of processing paths have as processing paths a generic processing path and at least one data frame type specific path. The method also involves processing the data frame according to the determined processing path.

In some embodiments of the invention, each data frame has associated with it a transport layer address and for each data frame the processing path the data frame is to be processed is determined using the transport layer address associated with the data frame.

In some embodiments of the invention, in at least one of the plurality of processing paths, at least one processing step is performed on the data frame using a processing engine implemented in hardware.

In some embodiments of the invention, in at least one of the plurality of processing paths, at least one processing step is performed on the data frame using a processing engine implemented with generic software and at least one processing step is performed on the data frame using a processing engine implemented in hardware.

In some embodiments of the invention, in at least one of the plurality of processing paths, at least one processing step is performed on the data frame using a processing engine implemented with data frame type specific software.

In some embodiments of the invention, in at least one of the plurality of processing paths, at least one processing step is performed on the data frame using a processing engine implemented with generic software and at least one processing step is performed on the data frame using a processing engine implemented with data frame type specific software.

In accordance with a second broad aspect, the invention provides an apparatus for processing data frames. The apparatus has one or more memories for storing information on a plurality of processing paths and a processor. The processor determines for each data frame a determined processing path of the plurality of processing paths in which the data frame is to be processed using the information stored in the memories. The apparatus also has a plurality of processing engines, each processing engine forming part of at least one of the plurality of processing paths. The plurality of processing engines have as processing engines a generic processing engine and at least one data frame type specific processing engine. Each processing engine forming part of the determined processing path is adapted to process the data frame.

In accordance with a third broad aspect, the invention provides a radio network controller having the above apparatus.

In accordance with a fourth broad aspect, the invention provides a system in a network having a core network interconnecting a plurality of RNCs (Radio Network Controllers) with each RNC interconnecting node Bs and having an off-load engine for processing data frames. The off-load engine has one or more memories for storing information on a plurality of processing paths. The off-load engine also has a processor for determining for each data frame a determined processing path of the plurality of processing paths in which the data frame is to be processed using the information stored in the one or more memories. The off-load engine also has a plurality of processing engines, each processing engine forming part of at least one of the plurality of processing paths. The plurality of processing engines have as processing engines a generic processing engine and at least one data frame type specific processing engine. Each processing engine forming part of the determined processing path is adapted to process the data frame.

In accordance with a fifth broad aspect, the invention provides in an apparatus having a plurality of processing engines, a method of processing data frames. The method involves for each data frame determining which processing engines of the plurality of processing engines are to process the data frame. The plurality of processing engines have as processing engines a generic processing engine and at least one data frame type specific processing engine. The method also involves processing the data frame using the processing engines that are to process the data frame.

In some embodiments of the invention the method involves scheduling the data frame for processing by the processing engines that are to process the data frame and processing the data frame according to the scheduling.

BRIEF DESCRIPTION OF THE DRAWINGS

Preferred embodiments of the invention will now be described with reference to the attached drawings in which:

FIG. 7 is an example frame format in UMTS of a data frame being parsed according the method of FIG. 5B, the data frame being an Iub DCH (Dedicated CHannel) data frame for an uplink;

FIG. 9 is a flow chart of a conventional method of combining data frames into a combined data frame in DHO (Diversity Hand-Off);

FIG. 10A is a diagram of four data frames in UMTS being combined into a combined frame according to the method of FIG. 9;

FIG. 11B is a table showing an illustrative example of the method of FIG. 11A being applied to combine the four data frames of FIG. 10A into the combined data frame of FIG. 9B;

DETAILED DESCRIPTION OF THE PREFERRED EMBODIMENTS

Figure 1:
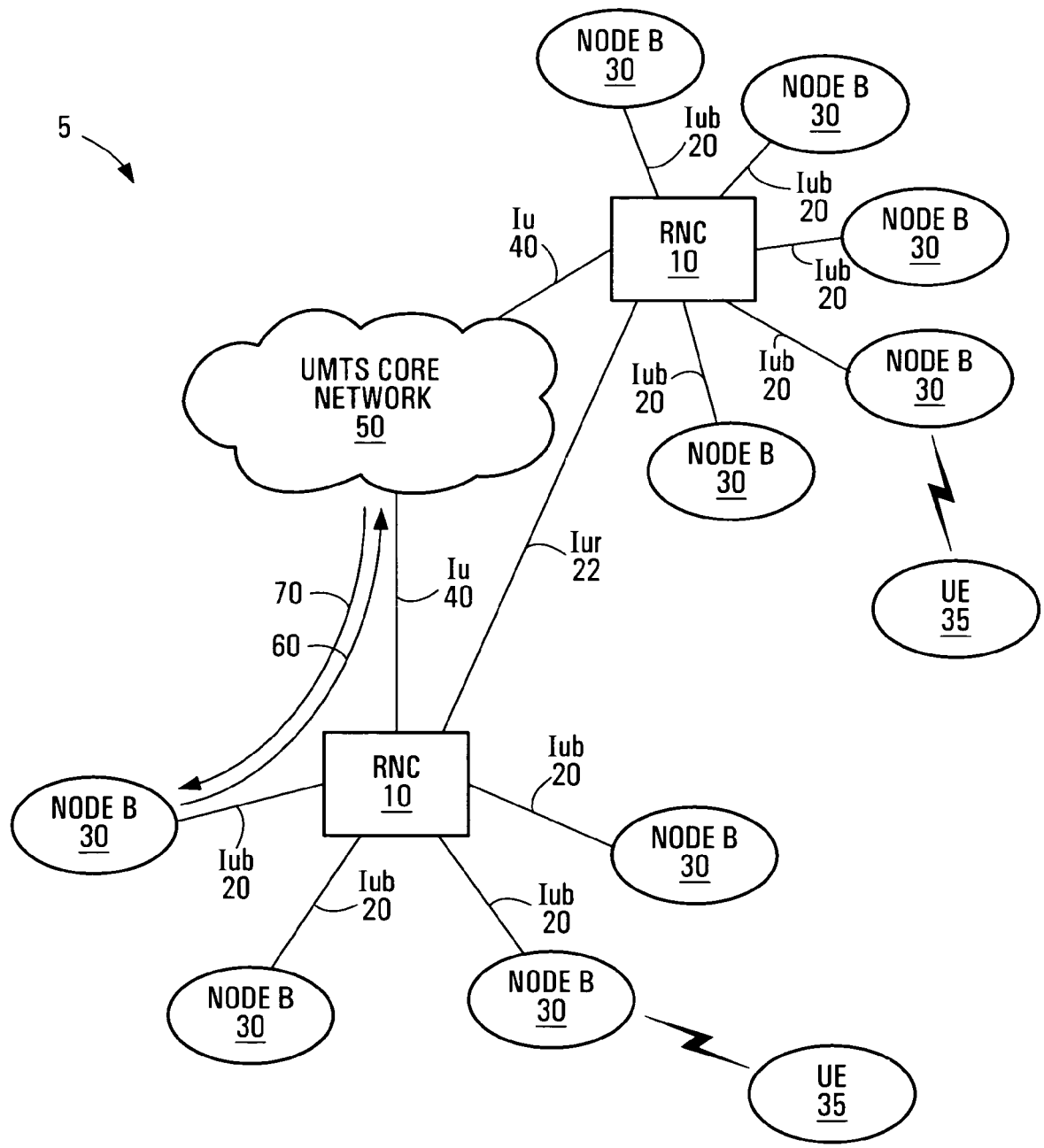
FIG. 1 is a block diagram of a conventional UMTS (Universal Mobile Telecommunications System) network.
Figure 2:
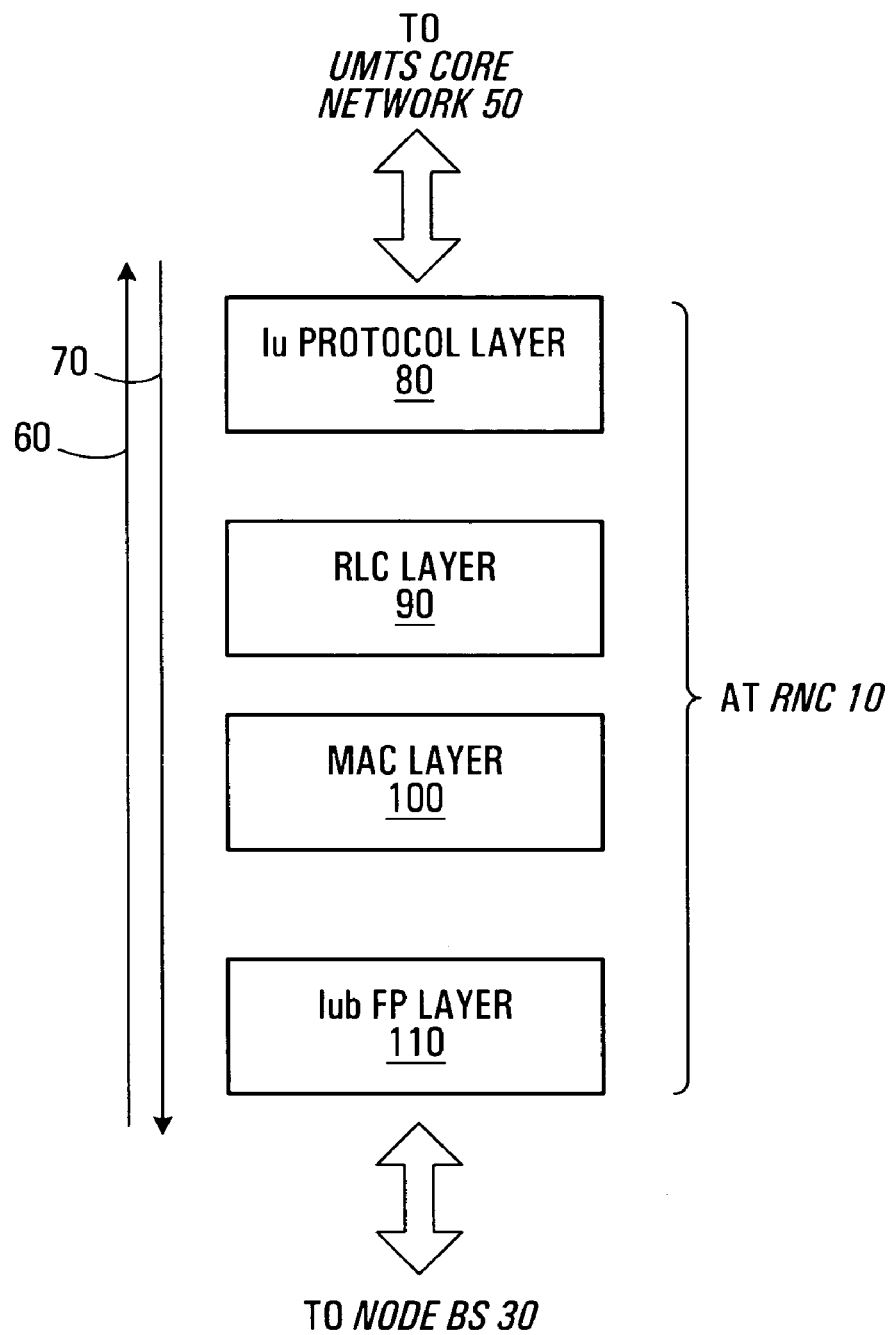
FIG. 2 is a block diagram of several protocol layers through which data frames at RNCs (Radio Network Controllers) of the network of FIG. 1 are processed.

With reference to FIGS. 1 and 2, data traffic flowing through the conventional RNCs (Radio Network Controller) 10 are processed through Iu protocol layer 80, RLC (Radio Link Control) protocol layer 90, MAC (Media Access Control) layer 100, and Iub FP (Frame Protocol) layer 110 within a single processing path using software that is capable of handling different types of data frames. By way of a broad introduction, embodiments of the invention that provide off-load engines used for processing data frames with the data frames being processing through data frame type specific paths will now be described. In particular, the data frames are processed through data type specific paths that make use of software optimized for limited types of data frames or that make use of hardware where possible to speed up processing of the data frames.

Figure 3:
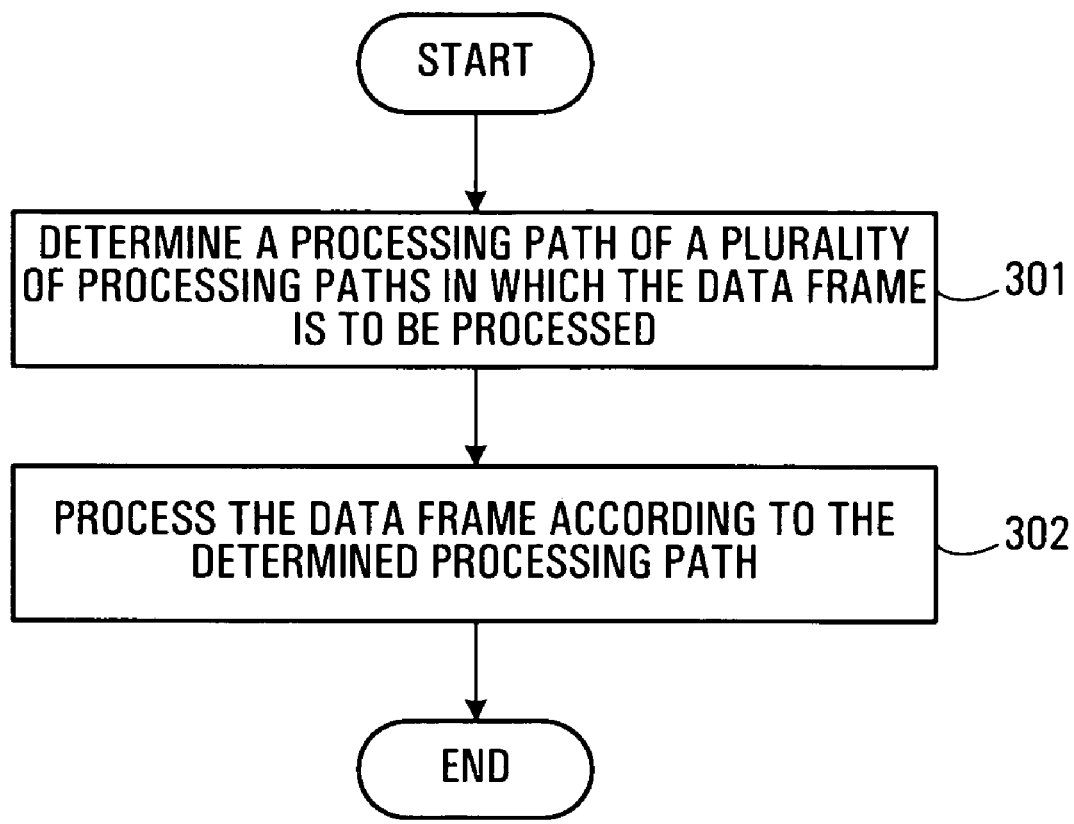
FIG. 3 is a flow chart of processing data frames, in accordance with an embodiment of the invention.

Referring to FIG. 3, shown is a flow chart of a method of processing data frames, in accordance with an embodiment of the invention. At step 301, a processing path of a plurality of processing paths in which a data frame is to be processed is determined. At least one of the processing paths is a generic processing path in which different types of data frames may be processed and at least one of the processing paths is adapted for processing one type or a limited number of types of data frame. At step 302, the data frame is processed using the one or more processing engines associated with the determined processing path. In some embodiments of the invention, each processing engine forms part of at least on of the processing paths and is implemented in one of hardware, generic software and data frame type specific software.

Figure 4:
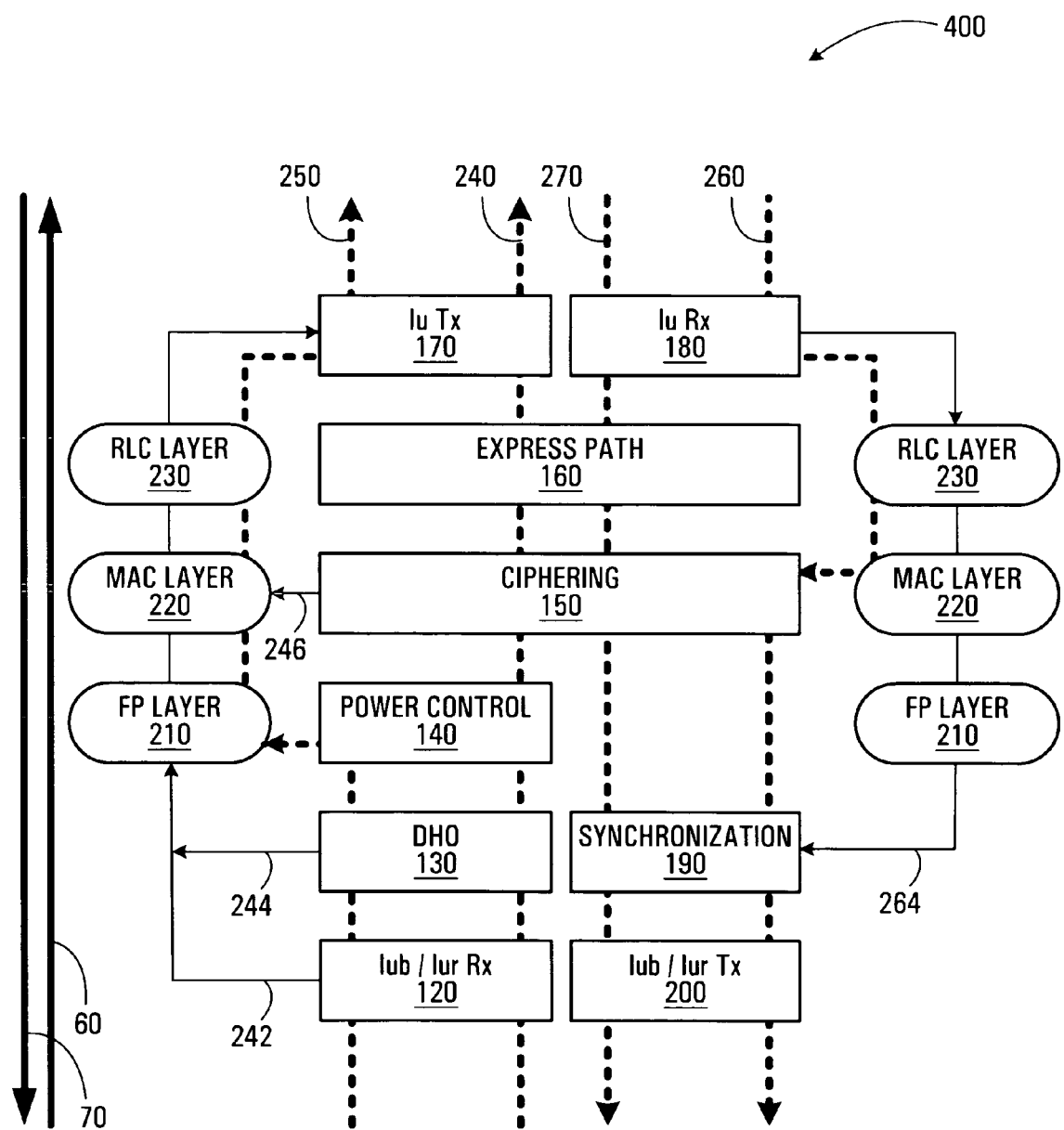
FIG. 4 is a block diagram of an off-load engine used to process data traffic at an RNC, according to an embodiment of the invention.

Referring to FIG. 4, shown is an off-load engine generally indicated by 400 which is used to process data traffic at an RNC, according to an embodiment of the invention. For example a network such as that shown in FIG. 1 could be implemented with RNCs featuring the off-load engine 400. As in the conventional RNC 10 of FIGS. 1 and 2, the off-load engine 400 processes data traffic in both the uplink 60 and the downlink 70 direction. For both the uplink 60 and the downlink 70, there are several processing engines which in the illustrated embodiments include Iub/Iur Rx 120, DHO (Diversity Hand-Off) 130, Power Control 140, Ciphering 150, Express Path 160, Iu Tx 170, Iu Rx 180, Synchronization 190, Iub/Iur Tx 200, FP (Frame Protocol) layer 210, MAC layer 220, and RLC layer 230. In one particular implementation, the Express Path 160 does not operate on voice data. The processing engines corresponding to Iub/Iur Rx 120, DHO 130, Power Control 140, Ciphering 150, Express Path 160, Iu Tx 170, Iu Rx 180, Synchronization 190 and Iub/Iur Tx 200 are each shown by square boxes which indicate that processing is done in hardware or using data frame type specific software. The FP layer 210, the MAC layer 220, and the RLC layer 230 are shown by ovals which indicate that processing is performed using generic software. In the illustrated example, eight processing paths 240,242,244,246,250,260, 264,270 are defined.

For the uplink 60, at the Iub/Iur Rx 120 incoming data frames are received. Each data frame has an associated type. This can be considered a type of the frame as a whole, or a type of information contained in the frame, or a type somehow otherwise associated with the frame. These types may be or may not be aligned with types defined by communications standards such as UMTS.

The associated types might include but are not limited to, for example, CS data, CS voice, PS data and control data. Connections are established for transmission of data frames. Each connection is used for transmission of data frames of a certain associated type and the data frames that are received through the connection have associated with them a transport layer address which has a one-to-one correspondence with the connection established for the data frame. As such, the associated type of the data frame can be determined from the transport layer address.

In one embodiment, each type has an associated processing path from processing paths 240, 242, 244, 246, 250, and the path through the processing engines of FIG. 3 that a given received data frame will pass for processing is determined on the basis of the transport layer address associated with the data frame. This involves defining a processing path for each transport layer address. This may for example involve associating each type with a respective processing path; determining the type for a given transport layer address to be that type associated with the connection associated with the transport layer address, and defining the processing path for the transport layer address to be that associated with the determined type. If a mapping from transport layer address directly to processing path is provided, then it can be seen that while the selected processing path might be based on the associated type, the associated type does not actually need to be determined to determine the processing path.

In one example, in the embodiment of FIG. 4 a received data frame which carries CS voice data is processed entirely using hardware along path 240 through Iub/Iur Rx 120, DHO 130, Power Control 140, Ciphering 150, Express Path 160 and Iu Tx 170. In another example, the received data frame carries packet switched data for example in RLC acknowledge mode and is processed along path 250 through Iub/Iur Rx 120, DHO 130, Power Control 140, FP layer 210, MAC layer 220, RLC layer 230, and Iu Tx 170. Along path 250, processing is performed partially using hardware at Iub/Iur Rx 120, DHO 130, Power Control 140, and Iu Tx 170 and partially using software at FP layer 210, MAC layer 220, and RLC layer 230. In this way, data frames on the uplink 60 are processed depending on the type of data they are carrying, and for each type of data frame preferably as many steps as possible are performed in hardware or data type specific software before having to revert to the processing engine implementing the generic software. Processing in hardware or using data frame type specific software reduces demand on CPU resources and this is especially beneficial for low complexity and high volume data types such as CS voice data which can be processed entirely in hardware. The invention is not limited to the processing engines of FIG. 2 as part of the off-load engine 400. For example, in other embodiments of the invention, an off-load engine has a plurality of processing engines with at least one processing engine being implemented in hardware or data frame type specific software and at least one processing engine being implemented in generic software.

For the downlink 70, at the Iu Rx 180 incoming data frames are received. From processing paths 260, 264, 270, the path through which the received data frame is to be processed is selected as described previously for the uplink 60. In one example, a received data frame which carries CS voice data is processed entirely in hardware along a path 270 through Iu Rx 180, Express Path 160, Ciphering 150, Synchronization 190, and Iub/Iur Tx 200. In another example, a received data frame which carries packet switched data is processed along a path 260 by hardware through Iu Rx 180, by data frame type generic software trough RLC layer 230 and MAC layer 220, and by hardware through Synchronization 190, and Iub/Iur Tx 200.

Further below, a detailed embodiment will be described which determines which processing path to take based on the transport layer address of each frame. More generally, it is to be understood that each frame is processed by a processing path from a set of possible processing paths collectively including engines implemented using data frame type generic software and engines each implemented using data frame type specific software or hardware. The particular path is determined by examining the frame in some manner or from information associated with the frame. There may be any number of ways of selecting a processing path for each frame. Furthermore, on a more general level, the invention is applicable to a system in which many different types of processing need to be employed for frames. UMTS is one example of such a system, but the invention is also applicable to other systems.

The invention is not limited to the processing paths 240, 242, 244, 246, 250, 260, 264, 270 and in other embodiments of the invention other processing paths are used depending on: 1) the type information carried by the data frames or frame type; 2) what processing is required to be performed on the data frames; and 3) availability of processing engines implemented in hardware or data frame type specific software.

Each processing engine of the off-load engine 400 of FIG. 4 will now be described in more detail.

For the uplink 60, the Iub/Iur Rx 120 receives data frames, determines a processing path to be followed by the data frame, and parses the data frame for further processing in the processing path.

Regarding DHO 130, in some cases for the uplink 60, the RNC 10 receives data frames which originate, for example, from one of MSs 35 but which flow through different paths in the network 5 and are received at the RNC 10 from different ones of the node Bs 30. The data frames are collected and a combined data frame is obtained from the collected data frames. This process is referred to as DHO and is handled by DHO 130.

Data frames that carry power control commands, for example from one of the node Bs 30 providing instructions for controlling power, are handled at Power Control 140.

Some types of data such as CS voice data, for example, may require ciphering which is performed at Ciphering 150.

In the uplink 60, express path 160 is responsible for monitoring of status information on the data frames.

At Iu Tx 170, the data frames are formatted for transmission to the UMTS core network 50.

For the downlink 70, the Iu Rx 180 receives data frames, determines a processing path to be followed by the data frame, and parses the data frame for further processing in the processing path. The Iu Rx 180 performs a similar function to the Iub/Iur Rx 120 but operates on data frames which are on the downlink 70. The data frames on the downlink 70 have a different format than those for the uplink 60. In the downlink 70 the Express path 160 provides commands such as power control commands and Ciphering of the data frames is performed at Ciphering 150. The data frames received on the downlink 70 are then synchronized at synchronization 190. At Iub/Iur Tx 200, the data frames are formatted for transmission to the node Bs 30.

In some embodiments of the invention, for both the uplink 60 and the downlink 70, some of the software processing previously performed by the Iub FP layer 110, the MAC layer 100, and the RLC layer 90 (See FIG. 2) is performed using generic software by the FP layer 210, the MAC layer 220, and the RLC layer 230, respectively; however, some of the processing previously, performed by the Iub FP layer 110, the MAC layer 100, and the RLC layer 90 is now off-loaded to hardware and/or data frame type specific software processing of engines including the Iub/Iur Rx 120, DHO 130, Power Control 140, Ciphering 150, Express path 160, synchronization 190, and Iub/Iur Tx 200.

In some embodiments of the invention, the FP layer 210, the MAC layer 220, and the RLC layer 230 retain the functionality of the Iub FP layer 110, the MAC layer 100, and the RLC layer 90, respectively, which is being off-loaded. This allows a data frame which normally would be processed by at least some hardware, through path 240 for example, to be routed for processing by software in the event the data frame cannot be processed through its intended processing path.

Figure 5A:
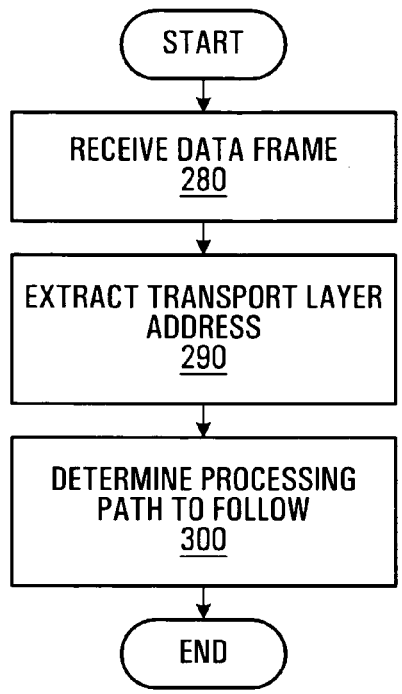
FIG. 5A is a flow chart of steps used by an Iub/Iur Rx (Receiver) of FIG. 3 in determining processing paths for received data frames.

Referring to FIG. 5A, shown is a flow chart of steps used by an Iub/Iur Rx such as the Iub/Iur Rx 120 of FIG. 4 in determining processing paths for received data frames. At step 280, a data frame is received from one of the node Bs 30 on the uplink 60 or the Iur link 22. At step 290, a transport layer address is extracted from the data frame and at step 300 the processing path to be followed by the data frame is determined on the basis of the extracted transport layer address. For the off-load engine 400 of FIG. 4, at step 300 the processing path for which a data frame is to be processed is identified using a path identifier. In one embodiment, this path identifier is a number, N, of processing engines that are to process the data frame in hardware or using a data frame type specific software before processing the data frame using data frame type generic software; however, embodiments of the invention are not limited to identifying processing paths with the number, N, and in other embodiments other path identifiers, such as a path identifier corresponding to a number associated with a numbered processing path for example, are used to identify processing paths. Identifying the processing path in which a data frame is to be processed identifies which processing engines are to process the data frames.

In another embodiment, parsing of data frames is also performed. This might immediately follow path determination or form part of the same processing as for the path determination.

Figure 5B:
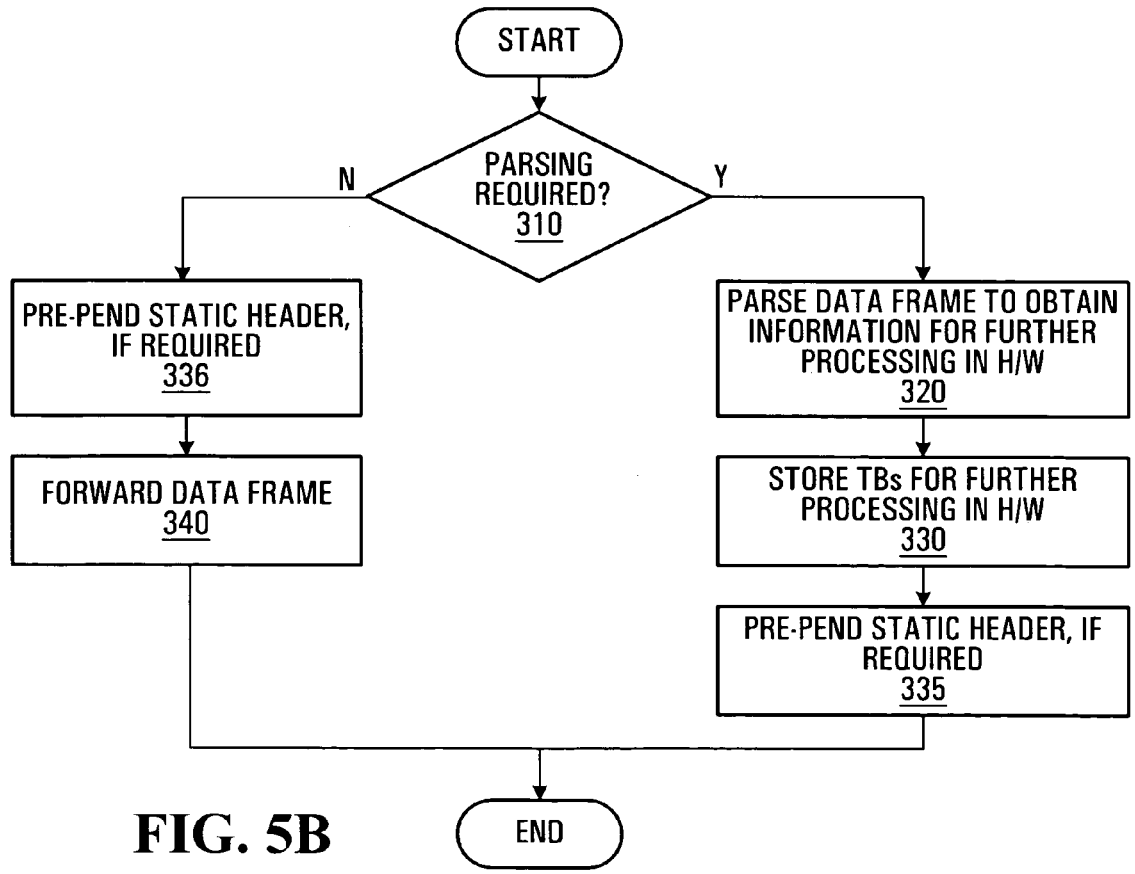
FIG. 5B is a flow chart of steps used by an Iub/Iur Rx of FIG. 3 in parsing the received data frames and pre-pending static headers if required.

Referring now to FIG. 5B, shown is a flow chart of steps used by the Iub/Iur Rx 120 of FIG. 4 in parsing the received data frames and pre-pending static headers if required. At step 310, if a data frame is required to be parsed to obtain additional information required for further processing, the data frame is parsed (step 320) and the information is stored for further processing (step 330). At steps 320, 330, the information being extracted from the data frame corresponds to TBs (Transfer. Blocks) in the data frame and each TB is stored. The "TB" terminology originates in the UMTS standards. More generally, the data frame at this point can be parsed into one or more payload sequences, a payload sequence being a portion of the payload of the data frame. In some embodiments, each payload sequence has a plurality of quality indicators associated with it. At step 335, if there is information associated with the data frame which is to be made available for use by any one or more of the processing engines (for example the FP layer 210, the MAC layer 220, the RLC layer 230, the DHO 130, Power Control 140, Ciphering 150, Express Path 160, and Iu Tx 170) for processing of the data frame, this information is inserted into a static header which is stored with the parsed data. When the data frame is required for further processing the static header is pre-pended to the data frame for use by any one or more of the processing engines. Context information in the static header is then readily available allowing the processing engines of FIG. 3 to rapidly make use of efficient look-ups. In some embodiments of the invention, the information in the static header depends on the type of data frame. For example for voice data, the size and number of TBs may be stored in the as part of the information in the static header. At step 310 if parsing is not required, a static header is pre-pended to the data frame, if required, for further processing (step 336). For example, in one embodiment of the invention, at step 336, a FT (Frame Type) that indicates whether the data frame carries control data is extracted from a header of the received data frame to determine whether the data frame carries control information, and, if so, a static header which contains, for example, transport layer IDs (Ethernet/IP headers, for example), process IDs, and internal context pointers, is pre-pended to the data frame. The data frame is then forwarded for further processing (step 340). In some embodiments, processing path determination is performed, for example using steps 280, 290, 300, and the data frames are then forwarded on. In another embodiment, processing path determination is performed and then the data frames are parsed, for example using steps 320, 330 before being forwarded on. In another embodiment, processing path determination and static header pre-pending are performed. In another embodiment, all of these functions are performed. The last embodiment is shown in FIGS. 5A and 5B. Furthermore, more generally pre-pending of a static header is performed at any one or more of the processing engines of the off-load engine 400.

Example implementations of some of the steps of FIGS. 5A and 5B will now be described in more detail. Regarding step 290 in which the transport layer address is extracted, in the embodiment of FIG. 4 termination of a transport protocol is done prior to processing steps at Iub/Iur Rx 120 (and at Iu Tx 170, Iu Rx 180, and Iub/Iur Tx 200) using hardware components such as network processors, for example. As an illustrative example, one example of a transport layer which might be employed in the embodiment of FIG. 4 consists of ATM (Asynchronous Transfer Mode) cells with an AAL2 (Asynchronous Transfer Mode Adaptation Layer 2) adaptation layer with variable sized CPS (Common Part Sub-layer) packets and an AAL2 SSCS (Service Specific Convergence Sub-Layer) with user packets of up to 64K bytes long. There is a segmentation/reassembly process, referred to as SSSAR (Service Specific Segmentation and reassembly sublayer) between the CPS and SSCS layers. The resulting data frames have one of several Frame Protocol types.

When a connection is established for a communications link, a respective transport layer address is associated with the connection. This transport layer address serves as a connection identifier and data frames carry this transport layer address. In one embodiment of the invention, the transport layer is ATM/AAL2, so the transport layer address is defined by an ATM VPI, VCI and an AAL2 CID. In one embodiment of the invention, the VPI, VCI, and CID are composed of 12, 16, and 8 bits, respectively, and the transport layer address is referred to as a TNL (Transport Network Layer) which has 36 bits. The invention is not limited to a TNL of 36 bits and, for example, in another embodiment of the invention for an a IPv6 (Internet. Protocol Version 6) transport layer, the TNL is more than 36 bits. In ATM, the TNL is a function VPI, VCI and AAL2 CID and at step 290 the TNL is extracted from the data frame.

At step 300, the associated type of the received data frame can be determined from the TNL. The processing path through which the data frame is processed depends on the associated type. However, the processing path to follow can be determined from the TLN without determining the associated type. The processing path for a given data frame will identify or allow an identification of the sequence of processing engines by which the frame is to be processed. This processing path is determined directly or indirectly from the associated type of the frame. A specific example of a method of achieving this is described below which assumes that a processing path is uniquely determined by a number of steps to be executed in hardware and/or data frame type specific software before processing using data frame type generic software.

In a specific implementation, at step 300, the identification of the processing path, in the form of a number, N, of steps to be performed in hardware and/or data frame type specific software before requiring processing using generic software, if any, is determined by performing a lookup using a combination of CAMs (Content Addressable Memories) and RAMs (Random Accessible Memories). The off-load engine 400 may be required to handle tens of thousands of connections at any one time with each connection requiring a look-up every 10, 20, 40 or 80 ms. Performing the look ups using the CAMs and RAMs is efficient.

Figure 6:
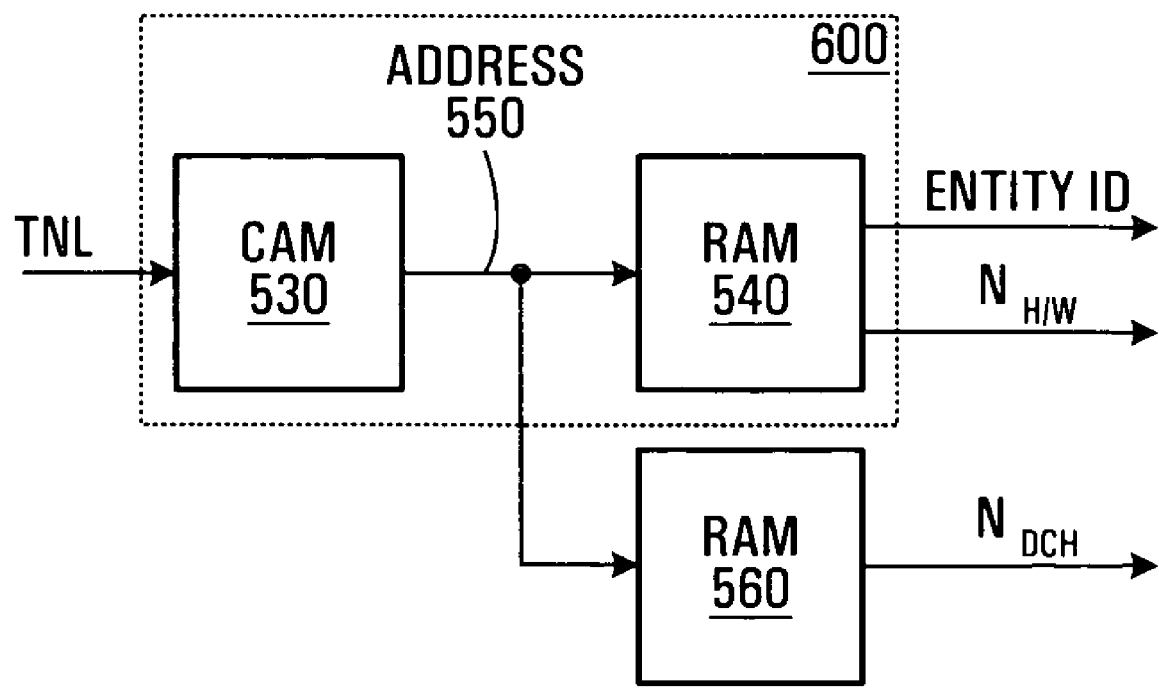
FIG. 6 is a block diagram of a combination of a CAM (Content Addressable Memory) and RAMs (Random Accessible Memories) used to determine the processing paths for received data frames and to obtain information for parsing the received data frames.

As shown in FIG. 6, a combination CAM/RAM 600 having a CAM 530 and a RAM 540 is used for extracting the number, N. The structure may also be used to extract an entity ID identifying a connection associated with the data frame. When a connection is established for receiving data frames having associated with it a TNL, the RAM 540 is updated with an entity ID that identifies the connection and the number, N. In some embodiments of the invention the entity ID and the number, N, are stored as a single number at a location in the RAM 540 and the address of the location in the RAM 540 is stored in the CAM 530 at a location in the CAM 530 associated with the TNL. The CAM/RAM structure could be used to extract other forms of processing path identifiers.

When a data frame is received, the TNL is input into the CAM 530 which returns an address 550 if one exists for the TNL. The address 550 is passed to the RAM 540 which retrieves the entity ID and the number, N, associated with the address 550. In the embodiment of FIG. 5, the TNL is 36-bit number allowing for $2^{36}$ connections; however, not all $2^{36}$ connections are used at one time at the RNC 10. With the use of the combination CAM/RAM 600, by recording, in the CAM 530, only those connections which are established the required amount of memory is low thereby making efficient use of memory. In some embodiments of the invention, the RAM 540 returns a single number from which the entity ID and the number, N, are extracted. For example, in one embodiment of the invention, the number returned by the RAM 540 is a 24-bit (3 Bytes) number from which 4 bits are reserved for the number, N, and 20 bits are reserved for the entity ID. The entity ID identifies a connection through which the data frame is transmitted.

Regarding the parsing step corresponding to step 320 of FIG. 5B, at this step further information is obtained from the data frame to allow further processing in hardware in the off-load engine 400. In UMTS, headers of data frames do not look like IP (Internet Protocol) or other headers, in that the length of the headers is not stored or easily derived from examination of the header itself. As such, in some cases some parsing is required to obtain additional information contained in the data frame. To understand the steps involved in parsing the data frame, it is worthwhile looking at the format of a data frame. In FIG. 7, shown is an example frame format UMTS of a data frame being parsed according the method of FIG. 4B, the data frame being an Iub DCH (Dedicated CHannel) data frame for the uplink 60. The data frame is generally indicated by 430 and is received at the Iub/Iur Rx 120. The data frame 430 has a header 410 and a payload 420 within which there is information for a plurality of DCHs. The header has a header CRC (Cyclic Redundancy Code) 440, a CFN (Connection Frame Number) 450, a TFI (Transport Format Indicator) 460 for each DCH of the data frame 430, and a FT (Frame Type) 480. The number of DCHs depends on the type of call associated with a data frame (or equivalently, depends of the connection established). The CFN 450 is an index for the data frame 430 in a connection specific sequence of data frames. The payload 420 has TBs (Transfer Blocks) 470 and padding 570 for each DCH; a QE (Quality Estimate) 500 of the data frame 430; a CRCI (CRC Indicator) 490 for each TB 470 of each DCH; a spare extension 510; and a payload checksum 520. In parsing the data frame 430, the TBs 430 are extracted from the payload.

As indicated above, a number of DCHs, $N_{DCH}$, within a data frame depends on the type associated with the data frame.

In one embodiment, given the entity ID the number of DCHs, $N_{DCH}$, is determined using CAMs and RAMs (not shown) where the entity ID is input into a CAM which returns an address that is input into a RAM. The RAM then outputs the number of DCHs, $N_{DCH}$. Alternatively, as shown in FIG. 6, the number, $N_{DCH}$, can be determined directly from the TNL using CAM 530 and the address 550 as an input to a RAM 560 with the RAM 560 outputting the number of DCHs, $N_{DCH}$.

With the number of DCHs, $N_{DCH}$, being known, the size of the header 410 is determined. With the number of DCHs, $N_{DCH}$, being known, the TFIs 460 are extracted from the header 410 for each DCH. Each TFI 460 is used for further look ups required to parse the payload 420. A TFI indicates the layout of the payload 420 for a respective one of the DCHs and indicates one of, for example, 10 to 20 valid formats. Using the TFIs 460, the size of the TBs 470 of each DCH is determined by look ups using, for example, CAMs and RAMs. Finally, with the size of the TBs 470 being known a total size of the payload 420 is determined allowing the Payload Checksum 520 to be verified while other processing is being performed on the data frame 430.

To fully parse the data frame 430, a length, $L_{DCH}$, in bytes of each DCH, a number, $N_{TB}$, of TBs 470 in each DCH, and a length, $L_{TB}$, in bytes of the TBs 470 of each DCH are determined. The length, $L_{DCH}$, the number, $N_{TB}$, and the length, $L_{TB}$, which are stored in a RAM are retrieved using look ups. For each DCH, the length, $L_{DCH}$, the number, $N_{TB}$, and the length, $L_{TB}$, are functions of the entity ID and a respective one of the TFIs 460. As such, the entity ID and the extracted TFI 460 of a DCH are used to look up the length, $L_{DCH}$, the number, $N_{TB}$, and the length, $L_{TB}$ in tables.

Using the length, $L_{DCH}$, the number, $N_{TB}$, and the length, $L_{TB}$, the payload 420 is parsed by extracting each TB 470 from the payload 420.

A parsing engine is used to parse the data frames. In some embodiments of the invention the parsing engine has one or more processors implemented in hardware, software or a combination of both hardware and software. Preferably, the processors are implemented in hardware as state machines to provide a speed-up in processing. In some embodiments of the invention, the parsing engine also has one or more memories for storing information such as payload sequences within the data frame and store profile information for example for each connection established for transmission of data frames. This allows the profile information to be looked up using for example the transport layer address of a data frame. The profile information is then used to extract the payload sequences from the data, frame.

Figure 8:
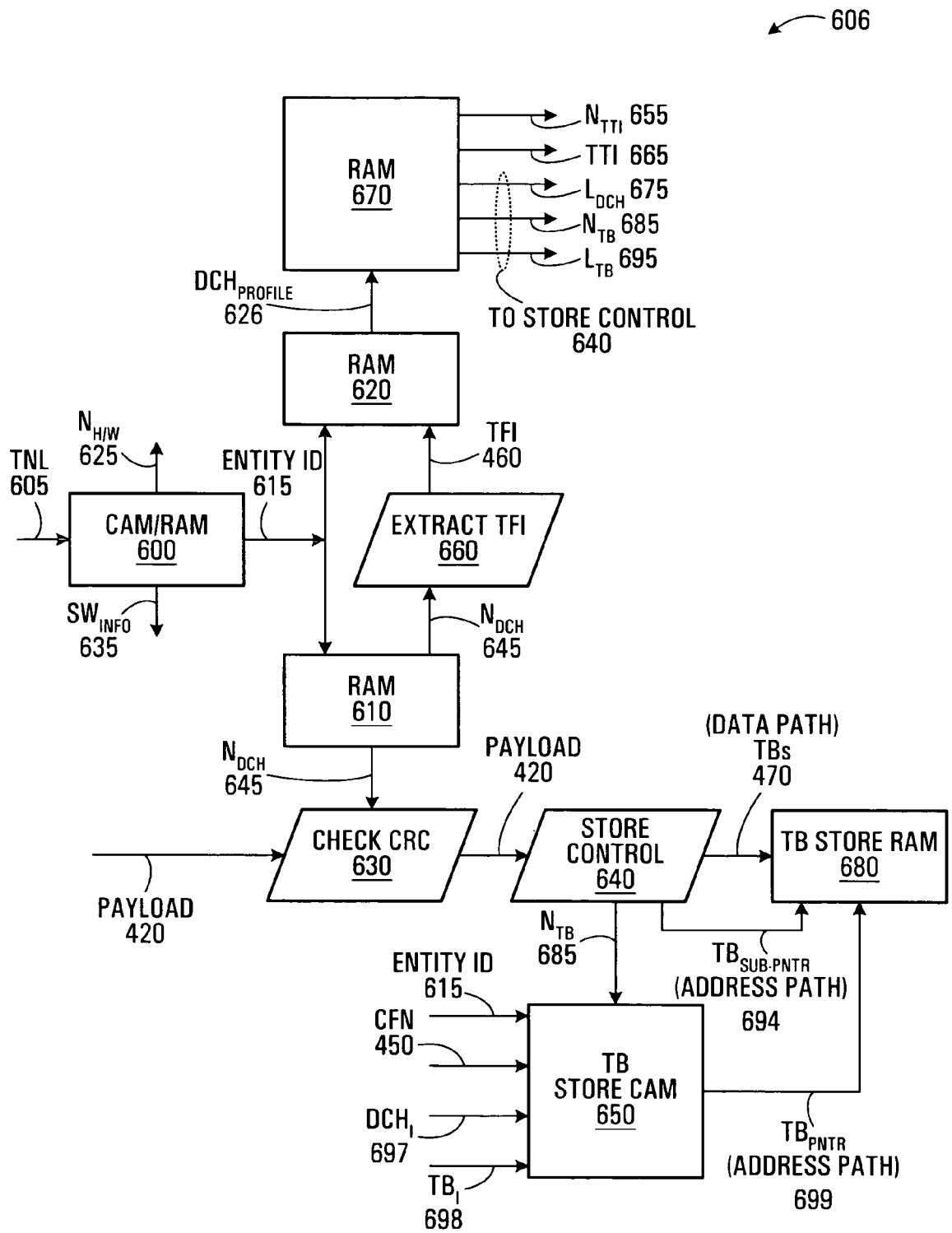
FIG. 8 is a block diagram of an example processing engine used to perform the parsing steps FIG. 5B.

Referring to FIG. 8, shown is a block diagram of an example parsing engine generally indicated by 606 and used to perform the parsing step 320 of FIG. 4B. A TNL 605 for data frame 430 is input into the combination CAM/RAM 600 which returns an entity ID 615, a number of hardware components, N, 625, and $SW_{info}$ 625. The entity ID identifies a previously established connection. The number, N, 625, identifies the number of hardware components and/or the number of components implementing data frame type specific software through which the data frame is to be processed. $SW_{info}$ 625 indicates whether a static header needs to be pre-pended to the data frame and what information is to be inserted into the static header. The entity ID 615 is input into RAM 610 which returns a number, $N_{DCH}$ 645 corresponding to the number of DCHs in the data frame 430. The number, $N_{mm}$, 645 is input into a Check CRC state machine 630 and an extract TFI state machine 660. The Check CRC state machine 630 uses the number, $N_{DCH}$, 645 to calculate a CRC value for the payload and verify the integrity of the payload (verify whether the data frame originates from the correct entity) while other look ups are proceeding. The CRC value is calculated "on the fly" as the payload 420 moves through hardware. The extract TFI state machine 660, loops through the $N_{DCH}$ 645 DCHs of data frame 430 and extracts the TFIs 460 of data frame 430 for each DCH. The TFIs 460 are output to a RAM 620. For each TFI 460, the RAM 620 uses the entity ID 615 and the TFI 460 to return a value, $DCS_{profile}$, 626 for the DCH. The $DCH_{profile}$ 625 is a profile indicator, from a limited list of profile indicators, for the entity ID 615 and the TFI 460. The value of the $DCH_{profile}$ 626 is input into a RAM 670. The RAM 670 returns a number, $N_{TTI}$ 655, a TTI (Transmission Time Interval) 665, a length, $L_{DCH}$, 675, in bytes of the DCH, a number, $N_{TB}$, 685 of TBs in the DCH, and a length, $L_{TB}$, 695 of the TBs in the DCH. As described in further detail below, the number, $N_{TTI}$, 655 and the TTI 665 are used for scheduling of data frames at DHO 130. The length, $L_{DCH}$, 675, the number, $N_{TB}$, 685, and the length, $L_{TB}$, 695 are used to parse the payload 420 of data frame 430. A store control state machine 640 receives the payload 420 and makes use of the length, $L_{DCH}$, 675, the number, $N_{TB}$, 685, and the length, $L_{TB}$, 695 to extract each TB 470 from the payload 420 and by way of a data path stores them individually as blocks in a TB store RAM 680. A block address of each TB 470 is determined using a TB store CAM 650 which automatically adds entries which have not already been entered. In particular, the number, $N_{TB}$, 685 the entity ID 615, the CFN, 450, a DCH index, $DCH_I$, 697, and a transfer block index, $TB_I$, 698 are input into the TB store CAM 650 which returns a TB pointer, $TB_{pntr}$, 699 by way of an address path. The DCH index, $DCH_I$, identifies a DCH for the data frame 430, and the $TB_I$, 698 identifies the TB 470 being stored. $TB_{pntr}$, 699 is used in combination with a TB sub-pointer, $TB_{sub-pntr}$, 694 which is returned by store control state machine 650 by way of an address path, to point to an address in TB store RAM 680 for storing the TB 470. In particular, using the TB sub-pointer, $TB_{sub-pntr}$, 694 for sub-addressing, the store control state machine 640 cycles through all of the bytes of TB 470 and stores them into the TB store RAM 680.

Implementations in UMTS make use of TBs that are always less than or equal to 625 bytes long. As such, in one embodiment of the invention, in the TB Store RAM 680 a 1024 byte block of memory is allocated for each TB 470 for design simplicity; however, the invention is not limited to 1024 byte blocks of memory being allocated for each TB 470 and in other embodiments of the invention other sizes for the blocks of memory are used. For example, most TBs are much smaller than 625 bytes in size, and in some embodiments of the invention a 128 byte block of memory is allocated for each TB thereby making efficient use of memory; however, in some embodiments data frames with TBs longer than 128 bytes are processed using generic software. Alternatively, the memory blocks may be linked together to form a TB.

The CAM/RAM 600, and the RAMs 610, 620 are updated as connections are established. For example, when a connection is being established, a unique transport layer address (TNL 605) and a profile, from which the number, $N_{DCH}$ 645, depends, are assigned for the connection. This is achieved by updating the CAM/RAM 600 to return the entity ID 615 identifying the connection, the number of components, N, 625 required for processing, and the static header information, $SW_{info}$ 635. The RAM 620 is also updated to return the $DCH_{profile}$ 626 for each DCH of a data frame being received. Finally, the RAM 610 is updated to return the number, $N_{DCH}$, 645 on the basis of the entity ID 615.

Furthermore, in some cases, a processing path may not be available for processing a data frame which is intended to be processed at least partially by hardware and/or data frame type specific software, for example for debug proposes, due to errors in the hardware, due to changes in protocol definitions, etc., and the data frame is required to be processed by data generic software. To re-route the data frame to another processing path for processing by generic frame software, the CAM/RAM 600 is updated to return a value for the number N 625 which results in data frames being processed through generic software.

In some embodiments of the invention, the CAM/RAM 600 returns a single number for the number N 625, the entity ID 615, and the number $SW_{info}$ 635. For example, in one embodiment of the invention, the number returned by the CAM/RAM 600 is a 24-bit number wherein the number N 625, the entity ID 615, and the number $SW_{info}$ 635 take up 3, 20, and 1 bit(s), respectively. To obtain the number N 625, the entity ID 615, and the number $SW_{info}$ 635, respective bits of the number being output from the CAM/RAM 600 are extracted from the 24-bit number. Similarly, in some embodiments of the invention, the RAM 670 outputs a single number which is, for example a 64-bit number, with the number; $N_{TTI}$, 655, the TTI 665, the length $L_{DCH}$ 675, the number $N_{TB}$ 685 and the length $L_{TB}$ 695 occupying, for example, 23, 3, 16, 6, and 13 bits, respectively, of the 64 bits. In other embodiments of the invention a number of bit greater or fewer than 64 bits is used.

Referring back to FIG. 4, for the uplink 60, once the TBs 470 have been stored in the TB Store RAM 680, they are made available for processing at processing steps which make use of hardware and/or data frame type specific software including DHO 130, Power Control 140, Ciphering 150, Express Path 160, and Iu TX 170, allowing off-loading to hardware and/or data frame type specific software.

It is to be understood that the invention is not limited to the parsing engine 606 of FIG. 8. For example, in other embodiments of the invention the CAM/RAM 600 is replaced with a RAM. Furthermore, in some embodiments of the invention, the RAMs 610, 620, 670 are implemented as a single RAM. In yet further embodiments of the invention, any one or more of the state machines 660, 630, 640 is a processor making use of software to provide functionality.

Diversity Hand-Off

In CDMA (Code Division Multiple Access) based systems like UMTS, a user's MS may be connected to several of the node Bs 30 at any one time. The node Bs 30 that are connected to a user's MS will each receive a copy of a data frame and forward it to the RNC 10 serving the BS. If frames are forwarded to multiple RNCs, then they are further forwarded by drift RNCs to a single serving RNC designated to, perform DHO for that user. As such, the serving RNC performing DHO receives several copies of the data frame; however, information within the data frames may be different from one data frame to another due to fading and other radio effects caused by interference in the real world. The serving RNC combines the data frames received into a combined data frame to eliminate the effects of fading and other radio effects. This is known as DHO (Diversity Hand-Off). To enable DHO, a FP (Frame Protocol) implemented at node Bs 30 inserts CRCIs in sections of the data frame such that the serving RNC can determine which sections are in error. In UMTS, the CRCI values indicate whether a CRC calculation is successful (0=valid, 1=error); however, in other standards as 1=valid and 0=error. The CRCIs are used in conjunction with a Quality Estimate of the data frame to combine the data frames into a combined data frame.

To understand DHO it is worthwhile looking at a conventional method of combining data frames into a combined data frame. Referring to FIG. 9, shown is a flow chart of conventional method of combining data frames into a combined data frame in DHO. This conventional method will be described with reference to FIG. 10A as an illustrative example in which it is assumed there are four data frames from four separate communications links which are to be combined into a combined data frame according to UMTS standards. For the four frames, a respective portion 701,702,703,704 of the payload of each frame is illustrated for the sake of example. The frames may include additional payload, not shown. Each portion 701, 702, 703, 704 has a QE (Quality Estimate) 740, CRCIs 751, 752, 753, and three TBs 710, 720, 730 each containing data. For each portion 701, 702, 703, 704, the TBs 710, 720, 730 are TBs for DCH 1, DCH 2, and DCH 3, respectively. The TBs 710, 720, 730 contain 12, 20, and 21 bits of data, respectively, and padding 750. In particular, the TBs 710, 720, 730 of portion 701 contain data labelled A, B, C, respectively. The TBs 710, 720, 730 of portion 702 contain data labelled D, E, F, respectively. The TBs 71a, 720, 730 of portion 703 contain data labelled G, H, I, respectively. The TBs 710, 720, 730 of portion 704 contain data labelled J, K, L, respectively. For each portion 701, 702, 703, 704, CRCIs 751, 752, 753 are CRCIs corresponding to TBs 710, 720, 730, respectively.

Figure 10B:
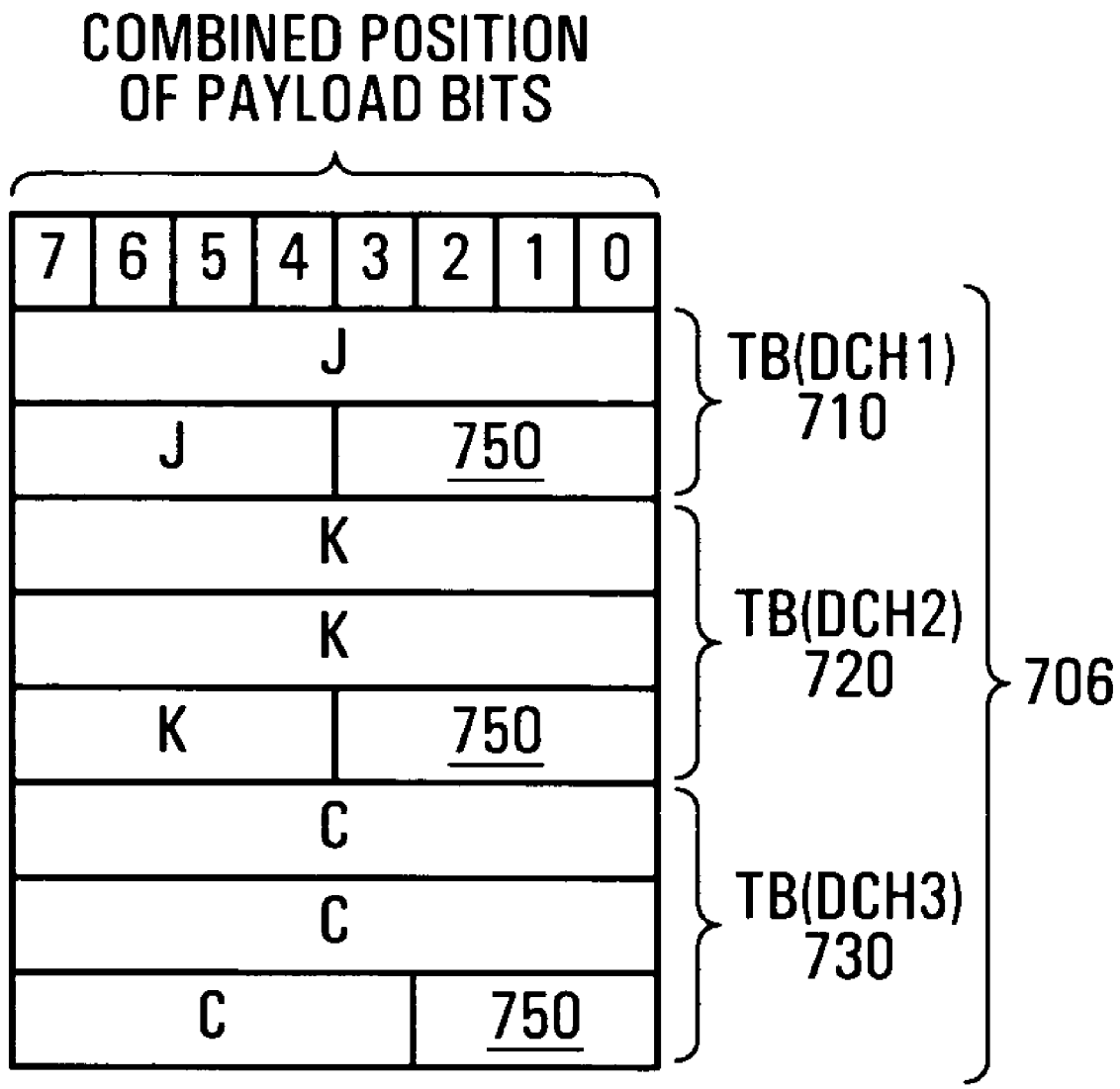
FIG. 10B is a diagram of a combined data frame obtained from the four data frames of FIG. 10A using the method of FIG. 9.

Referring now to FIG. 9, at step 810 a plurality of data frames are received at the RNC 10 originating from one of the MSs 35 via different ones of the nodes Bs 30. For our example, the data frames contain payload portions 701,702, 703,704. At step 820, beginning with TBs 710, the CRCI 751 of each TB 710 is extracted. At step 830, if the extracted CRCIs 751 all have a value equal to 1 (indicating an error) then all TBs 710 are selected (step 840); otherwise only those TBs 710 with CRCI 751 having a value of 0 are selected (step 850). In FIG. 10A, the CRCIs 751 of each portion 701, 702, 703, 704 all have a CRCI value of 0. As such, in this particular case, the TBs 751 of all portions 701, 702, 703, 704 are selected. At step 860, of the selected TBs, the TB corresponding to one of the portions 701, 702, 703, 704 having the lowest QE is inserted into a combined data frame 716, as shown in FIG. 10B. The TBs 710 of portions 701, 702, 703, 704 have values of 100, 150, 200, 50, respectively, for the QE 740. As such, the TB 710 of portion 704 is placed in the combined data frame 716. A portion 706 of the payload of the combined data frame 716 is shown in FIG. 10B. In particular, portion 706 is shown having TB 710 containing data labelled J which correspond to the data for TB 710 of portion 704. At step 870, if there is another TB in the data frames a next TB is examined (step 880) and steps 820, 830, 840, 850, 860, and 870 are repeated. In the illustrative example, of FIGS. 9, 10A, and 10B, steps 820, 830, 840, 850, 860, and 870 are repeated for TBs 720, 730. The TBs 720 of portions 702 and 704 have CRCIs 752 with values 0 and of these TBs 752, portion 704 has a lowest QE 740 of 50. As such, the data labelled K corresponding to the TB 720 of portion 704 is inserted into the combined data frame 716 as shown in TB 720 of portion 706 in FIG. 10B. The TB 730 of portion 701 is the only TB with a CRCI 753 having a value 0. As such the data labelled C corresponding to the TB 730 of portion 701 is inserted into the combined data frame 716 as shown in TB 730 of portion 706 in FIG. 10B.

The method of FIG. 9 is CPU intensive causing bottlenecks in cases of high traffic flow through an RNC.

Another embodiment of the invention provides a new method of performing DHO in software or hardware using binary operations.

Figure 11A:
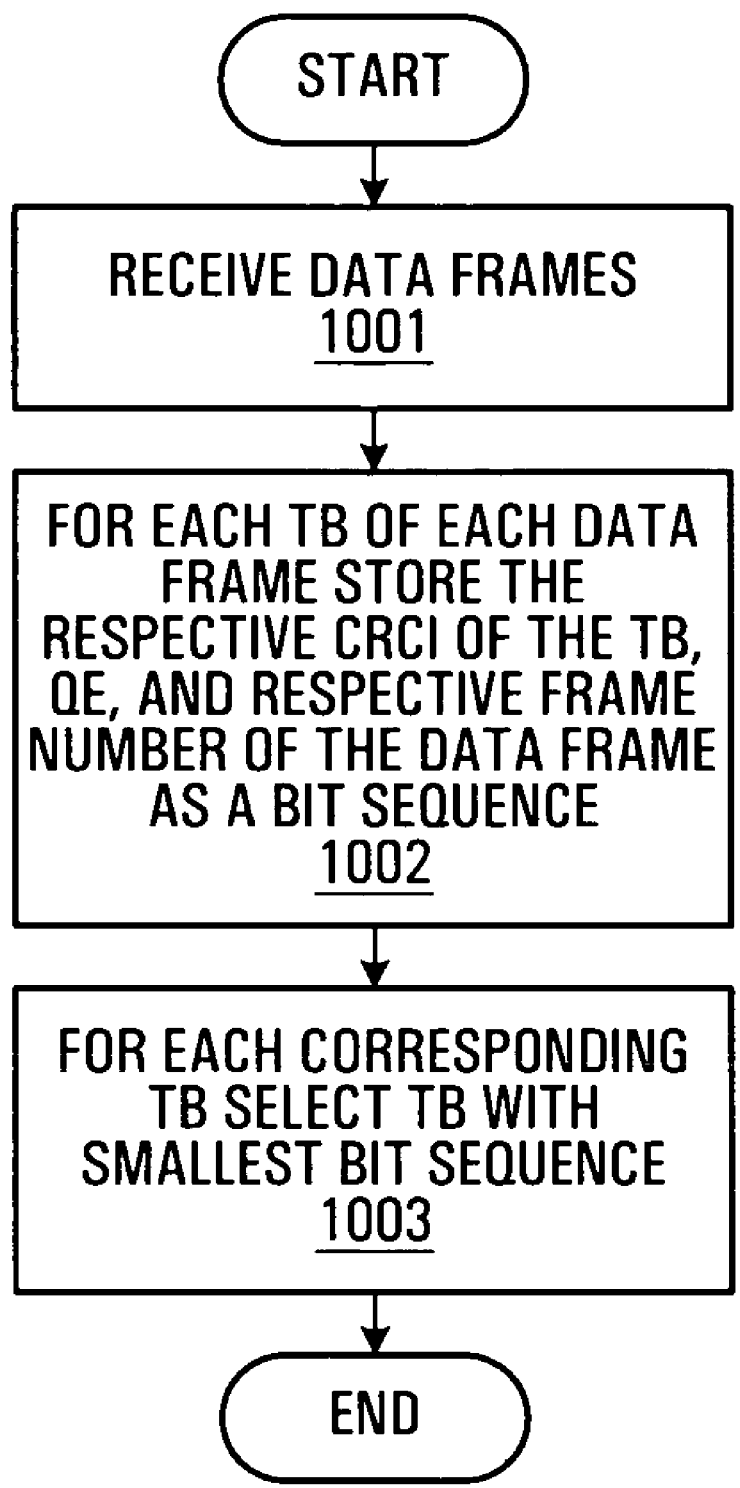
FIG. 11A is a flow chart of a method of combining data frames into a combined data frame, according to another embodiment of the invention.

Referring to FIG. 11A, shown is a flow chart of a method of combining data frames into a combined data frame, according to another embodiment of the invention. As step 1001 data frames are received. At step 1002, for each TB of each received data frame, a respective CRCI of the TB, a QE (Quality Estimate) for the received data frame, and a respective frame number for the received data frame are stored as a bit sequence. After step 1002, there are stored a plurality of bit sequences for each TB of each received data frame. Furthermore, each TB of a received data frame has a corresponding TB in another one of the received data frames. At step 1003, for corresponding TBs from each of the received data frames, the corresponding TB having the bit sequence having a minimum value is selected as a TB for the combined data frame. In some embodiments of the invention, depending on the quality indicator being used, the bit sequence having a maximum value is selected.

Referring to FIG. 11B, shown is a table which will be used as an illustrative example of the method of FIG. 11A being applied to combine the four payload portions 701, 702, 703, 704 of FIG. 10A into the combined data frame 716 of FIG. 10B. For purposes of clarity, the illustrative example will show how the portions 701, 702, 703, 704 are combined into portion 706 of FIG. 10B only for corresponding TBs 720. Column 1011 identifies the CRCI of the corresponding TB 720 for each of the data frames. In particular, in rows 1021, 1022, 1023, 1024 of column 1011, the CRCI of TB 720 for data frames containing payload portions 701, 702, 703, 704, respectively, are given.

In a column 1031, the QE is specified for each of the payload portions 701, 702, 703, 704. In particular, in rows 1021, 1022, 1023, 1024 of column 1031, the QE is given in base-10 notation for the four data frames, respectively. In a column 1041, a frame number identifies each of the data frames. In particular, in row 1021, the data frame having payload portion 701 is identified as data frame number 1; in row 1022 the data frame having payload portion 702 is identified as data frame number 2; in row 1023 the data frame having payload portion 703 is identified as data frame number 3; and in row 1024 the data frame having payload portion 704 is identified as data frame number 4.

In rows 1061, 1062, 1063, 1064, the CRCI, the QE and the data frame number of rows 1021, 1022, 1023, 1024, respectively, are written in base-2 notation as bit sequences. Row 1050 shows the bit numbering employed with 15 being most significant and 0 being least significant. For example, the CRCI of data frame which has a value of 1 as shown in column 1011, row 1021, is re-written as 1 in base-2 notation in column 1011, row 1061; the QE of the same data frame which has a value of 100 as shown in column 1031, row 1021, is re-written as 01100100 in base-2 notation in column 1031, row 1061; and the data frame number of the data frame which has a value of 1 as shown in column 1041, row 1021, is re-written as 0000001 in base-2 notation in column 1041, row 1061.

For each row 1061, 1062, 1063, 1064, the CRCI, the QE, and the data frame number are combined into a 16-bit bit sequence for each corresponding TB 720. For example, in row 1061, the CRCI of column 1011 expressed as 1, the QE of column 1031 expressed as 01100100, and the data frame number of column 1041 expressed as 0000001 are combined into a 16-bit bit sequence corresponding to 1011001000000001 with, as shown by row 1050, the CRCI of column 1031 occupying the most significant bit corresponding to bit 15. The QE of column 1031 occupies bits 7 to 14, and the data frame number of column 1041 occupies the least significant bits corresponding to bits 0 to 6. However, this is only one implementation and in other embodiments of the invention, the bit sequences are bit sequence having more or less than 16 bits. Furthermore, in other embodiments of the invention, the CRCI 752 occupies more than one bit and the QE 740 and the data frame number occupies more or less than 8 and 7 bits, respectively.

From rows 1061, 1062, 1063, 1064, the bit sequence having a minimum value is selected. In this case, the selected bit sequence corresponds to the bit sequence of row 1064 and is shown in row 1070. The selected the bit sequence having the minimum value corresponds to the data frame which has the lowest QE of the data frames 711, 712, 713, 714 having a CRCI value of 0. In this particular case, the minimum bit sequence of 1070 corresponds to the data frame having payload portion 704. As such, the TB of that data frame is selected as a TB for a combined data frame. The data frame is identified by the data frame number contained in the 7 least significant bits which in this case have a value of 4 in base-10 notation.

By combining the CRCI, the QE and the frame number as a bit sequence, DHO is implemented in two simple steps. These steps can be performed very efficiently, for example, on a SIMD CPU (like PowerPC's AltiVec), or, in some embodiments of the invention the calculation is done in parallel with other DHO calculations on other data frames in a few clock cycles as AltiVec vector minimum instructions. In the embodiment of FIG. 11A, the seven least significant bits for the data frame number 1040 are used as control vectors for an AltiVec vperm instruction, and a combined data frame is assembled in as little as a few instructions.

The above example has provided an illustrative example of how the method of FIG. 11A is applied in selecting a corresponding TB of the corresponding TBs 720 of four data frames as a TB for the combined data frame 716. This method would be repeated for each set of corresponding TBs. In some embodiments of the invention, the method of FIG. 11A is applied to each group of corresponding payload sequences in parallel. Furthermore, in the illustrative example there are two quality indicators corresponding to the QE and the CRCI being used. In some embodiments of the invention, there is at least one quality indicator being used. In addition, in some embodiments of the invention the data frames being combined have at least one payload sequence.

In some embodiments of the invention, the method of FIG. 11A is implemented in software. In other embodiments of the invention, the method of FIG. 11A is implemented in hardware as will now be described with reference to FIG. 11C.

Figure 11C:
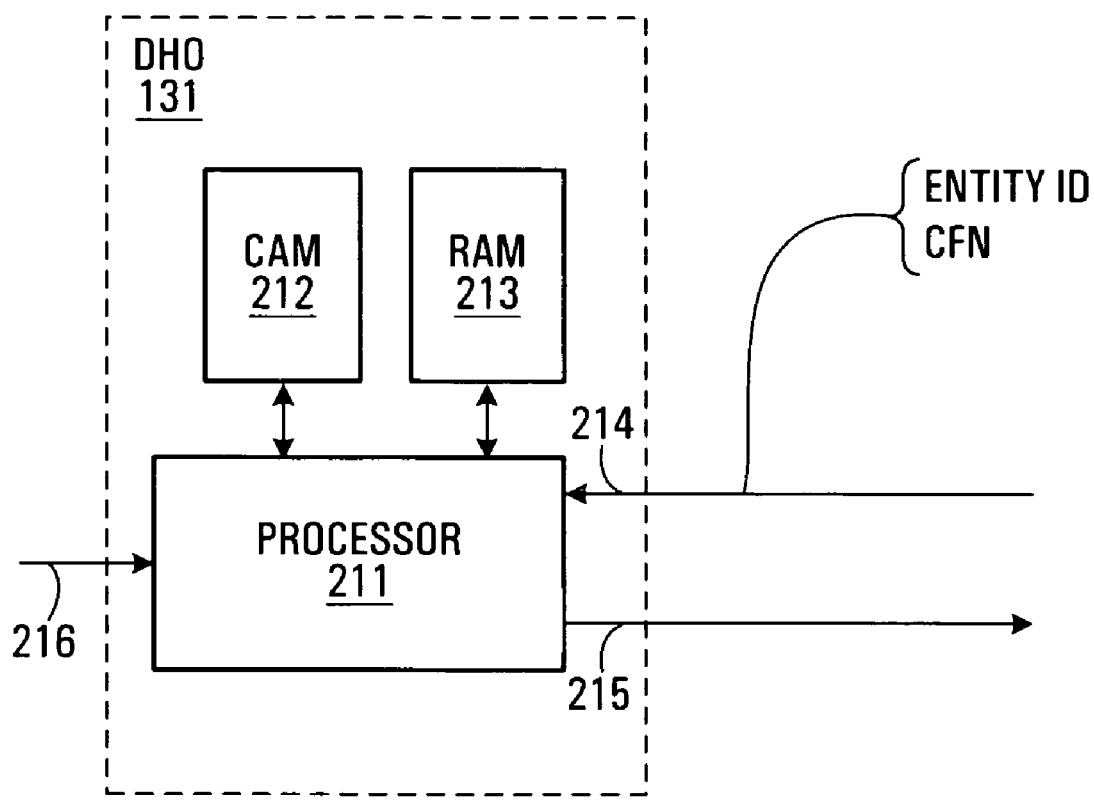
FIG. 11C is a block diagram of a processing engine of FIG. 4 used to obtain the combined data frame of FIG. 10B from the four data frames of FIG. 10A, according to an embodiment of the invention.

Referring to FIG. 11C, shown is a block diagram of a processing engine 131 for implementing DHO according to an embodiment of the invention. This might for example be used as processing engine 130 in FIG. 4. The DHO processing engine 131 has a processor 211 connected to a CAM 212 and a RAM 213. In some embodiments of the invention, the processor 211 receives the TBs, QEs, and CRCIs of each data frame as input 216. For each TB, the processor 211 generates a bit sequence for QE and the CRCI associated with the TB and stores the bit sequence and the TB and in the RAM 213, and addresses for the bit sequence and the TB are stored in the CAM 212. In some embodiments of the invention, the CAM 212 and RAM 213 are populated as data frames are being parsed by another processing engine. Alternatively, the processing engine 211 receives the data frames by way of input 216 and parses the data frames. The processor 211 receives an input 214 which contains an entity ID and a CFN and looks-up addresses of the bit sequences of data frames to be combined using the CAM 212 and RAM 213 on the basis of the entity ID and the CFN. For each group of corresponding TBs, the processor 211 then selects a TBs for a combined data frame by determining which TB has associated with it a bit sequence that has a minimum value. For each TB selected, the address associated with the selected TB is stored as a permanent address in the CAM 212 and addresses of other TBs within the same group of corresponding TBs as the selected TB are erased. The processor 211 then combines the selected TBs to from a combined data frame by looking-up the addresses which have not been erased and outputs the combined data frame as output 215.

In the embodiment of FIG. 11C, the entity ID and the CFN are used as identifiers for the TBs and bit sequences of data frames that are to be combined and in other embodiments of the invention, other identifiers are used.

In some embodiments of the invention, the determination of which bit sequence has a minimum value is performed using for example AltiVec vector minimum instructions. As discussed above with reference to FIG. 11A, in some embodiments of the invention a frame number forms part of the bit sequence of each TB selected and the frame number is extracted from the bit sequence having the minimum value. This might be done for example using an AltiVec vsel (vector select) instruction.

In some embodiments of the invention, the DHO apparatus 131 of FIG. 11C is implemented for use in the off-load engine 400 of FIG. 4 in which the parsing engine 606 of FIG. 8 not only performs parsing of data frames as part of the Iub/Iur Rx 120 but also combines data frames by having the functionality of the processor 211 of FIG. 11C implemented in the store control state machine 640. For example, in one embodiment of the invention, the CAM 212, the RAM 213, and the processor 211 are implemented as the CAM 650, the RAM 680, and the store control state machine 640, respectively, of the parsing engine 606 of FIG. 8.

The data frames need not be combined all at the same time once they all have been received. In some embodiments of the invention, data frames are combined as they are received thereby eliminating the need for buffering all of the data frames at the same time.

Figure 12:
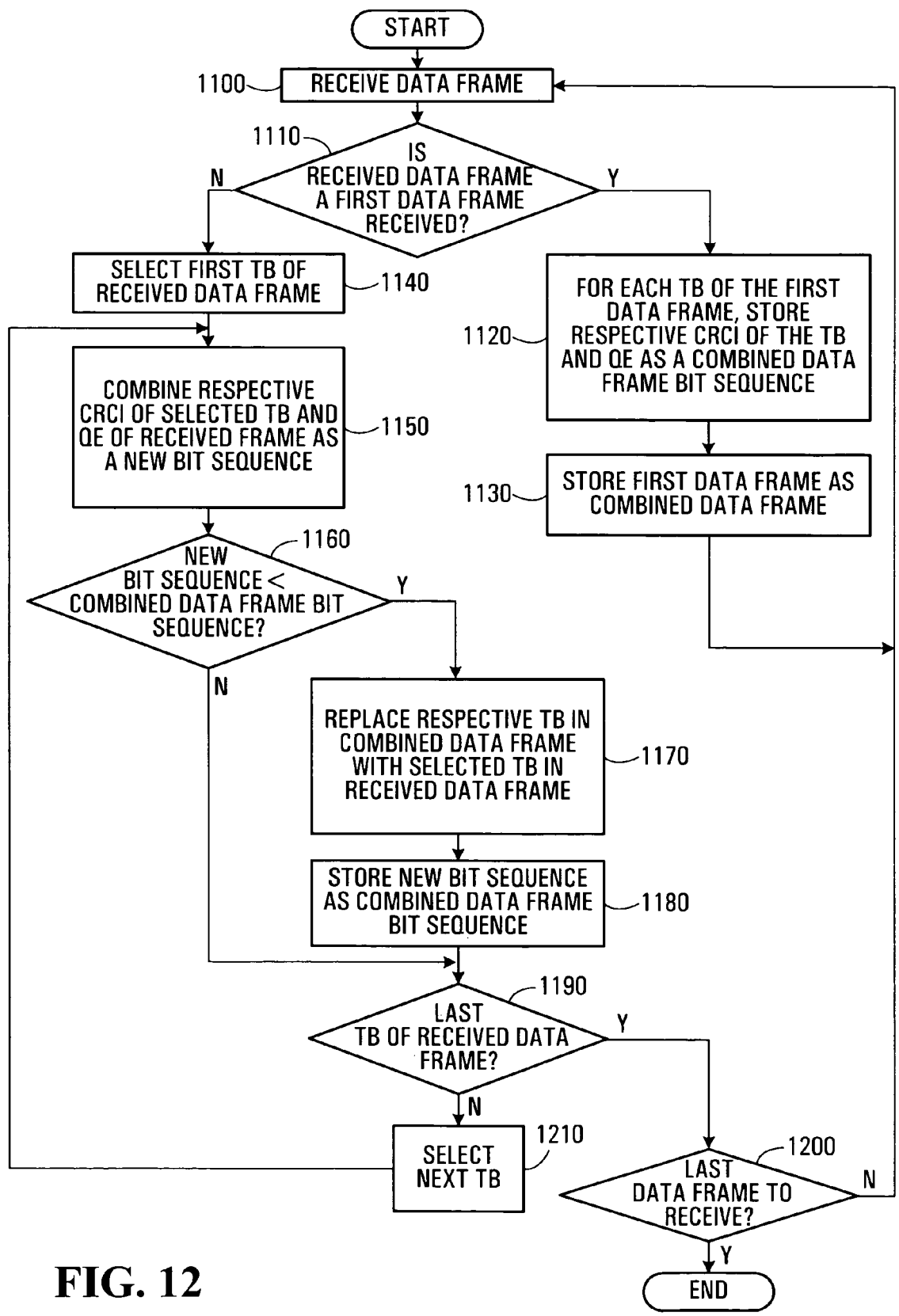
FIG. 12 is a flow chart of another method of combining data frames into a combined data frame in DHO, according to another embodiment of the invention.

Referring to FIG. 12 shown is a flow chart of a method of combining data frames into a combined data frame in DHO, according to another embodiment of the invention. The method of FIG. 11 allows the combined data frame to be determined "on-the-fly" as data frames are received allowing minimal buffering of data frames. At step 1100, a data frame is received. At step 1110, if the received data frame is a first data frame being received of a set of data frames that are to be combined, then for each TB of the first data frame a respective CRCI for the TB, and a QE for the first data frame are stored in a memory as a combined data frame bit sequence with the CRCI occupying the most significant bits and the QE occupying the least significant bits (step 1120). At step 1130, the first data frame is stored as a combined data frame before returning to step 1100 for receiving a next data frame.

At step 1110, if the received data frame is not a first data frame, a first TB of the received data frame is selected (step 1140). At step 1150 a respective CRCI of the selected TB, and a QE and frame number of the received data frame are combined into a new bit sequence. At step 1160, if the new bit sequence is less than the combined data frame bit sequence then a corresponding TB in the combined data frame is replaced with the selected TB in the received data frame (step 1170) and the new bit sequence replaces the combined data frame bit sequence (step 1180); otherwise, the combined data frame bit sequence and the combined data frame remain unchanged. At step 1190, if the selected TB is not a last one of the TBs of the received data frame, a next TB is selected and steps 1150, 1160, 1170, 1180, 1190 are repeated; otherwise, if the received data frame is not the last data frame to be used in DHO (step 1200), a next received data frame is processed by returning to step 1100.

In some embodiments of the invention, prior to receiving the first data frame, a "dummy" data frame having TBs is stored as the combined data frame. Each TB of the "dummy" data frame is given a bit sequence which indicates poor quality. For example, each TB of the "dummy" data frame is given a bit sequence that has a highest possible value (a series of one) with this value being stored as the combined data frame bit sequence. In this way, the first data frame is processed through the same steps (steps 1140, 1150, 1160, 1170, 1180, 1190, 1210) as the other received data frame without the need of step 1110, 1120, and 1130. However, in such embodiments, at step 1200 once the last data frame has been received, a check is performed to verify whether TBs within the dummy frame have been replaced with TBs from the received data frame to prevent incorrect information from being transmitted and to identify missing data frames which have not been received.

In the embodiments of FIGS. 11A, 11B, 11C, and 12, each of corresponding TBs of data frames, has a CRCI and a QE as a quality indicators for the corresponding TB; however, the invention is not limited to embodiments in which a CRCI and a QE are used as quality indicators. In other embodiments of the invention other quality indicators may be used so long as they can be combined in a bit sequence that is determinative of the best TB. Furthermore, in the embodiments of FIGS. 11A, 11B, 11C, and 12, the corresponding TBs are selected from data frames to obtain the combined data frame; however, the invention is not limited to TBs being selected. In other embodiments of the invention, payload sequences each having plurality of quality indicators are selected.

Ciphering

Referring back to FIG. 2, one of the functions of the MAC layer 100 is ciphering (encryption) and in some embodiments of the invention, ciphering is performed by ciphering 150 in the off-load engine 400 of FIG. 3 in hardware using for example.

Scheduling

When frames are received for example at an RNC (Radio Network Controller), the data frames are processed by one or more processing engines; however, timing issues impose limitations as to when the data frames are processed by the processing engines. In some embodiments of the invention, the data frames are scheduled for processing by one or more processing engines. In particular, in some embodiments of the invention a scheduler provides scheduling of the data frames for processing by the processing engines. An embodiment of the invention in which a scheduler is used to providing scheduling of data frames for processing by processing engines will now be described.

Figure 13:
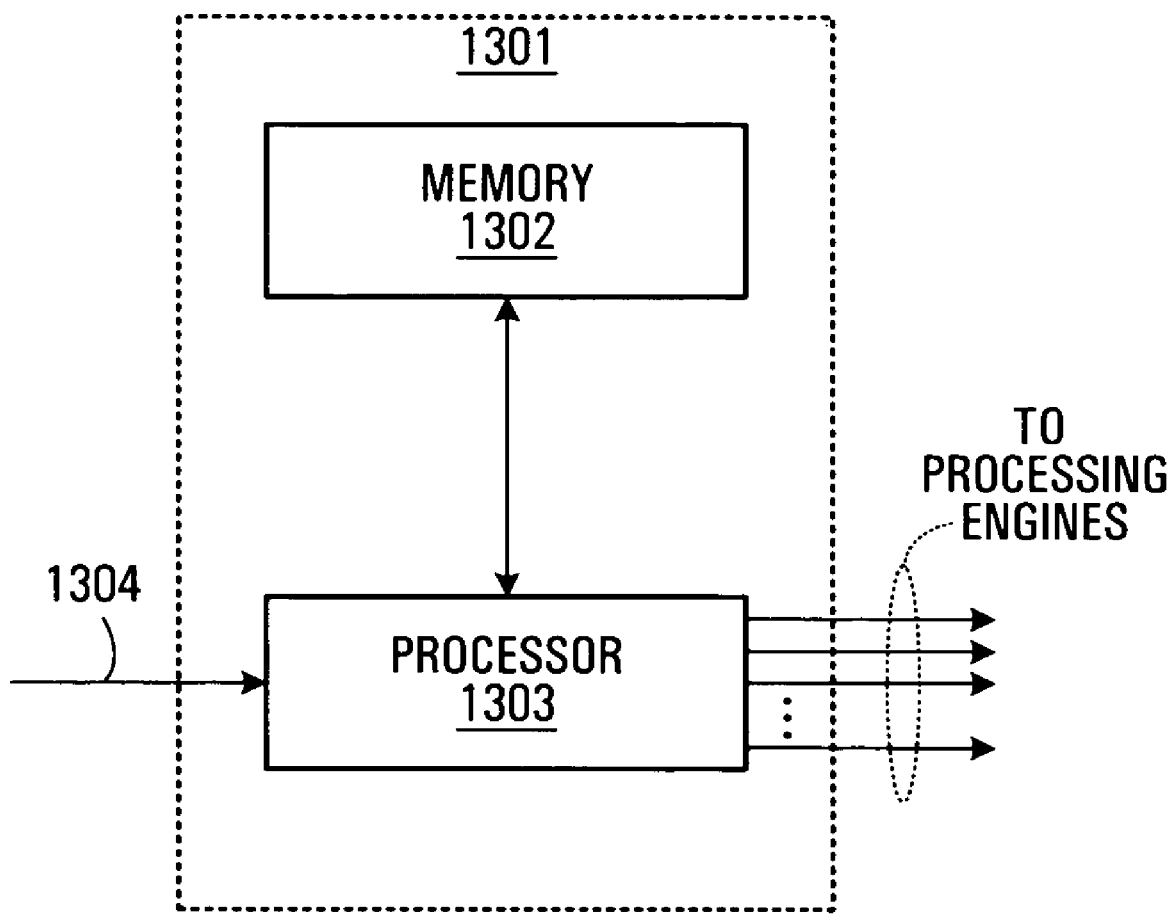
FIG. 13 is a block diagram of an event scheduler for processing engines, according to another embodiment of the invention.

Referring to FIG. 13, shown is a block diagram of an event scheduler 1301 for processing engines, according to an embodiment of the invention. The scheduler 1301 has at least one memory 1302 (only one memory 1302 shown in FIG. 13) and a processor 1303 capable of accessing information stored in the memory 1302. The memory stores a plurality of event information with each event in information being associated with one of at least one processing engine (not shown). Responsive to a prompt 1304, having a specified time, the processor 1303 looks up on the basis of the specified time one or more event information of the plurality of event information to report at the specified time using the memory 1302. For each event information to report at the specified time, the processor forwards at least some of the event information to report to the associated processing engine.

Another scheduler will now be described in the context of the off-load engine 400 of FIG. 4; however, the invention is not limited to a scheduler being implemented with the off-load engine 400. In other embodiments of the invention, a scheduler provides scheduling of data frames for processing by any processing engine.

In the illustrative example, the scheduler is implemented in conjunction with the off-load engine 400 of FIG. 4. Referring back to FIG. 8, once data frames have been parsed and TBs stored in the TB store RAM 680, the TBs are kept in the TB store RAM 680 until an event occurs requiring the TBs to be forwarded or looked-up. Each such event is subject to scheduling which will now be described.

Figure 14:
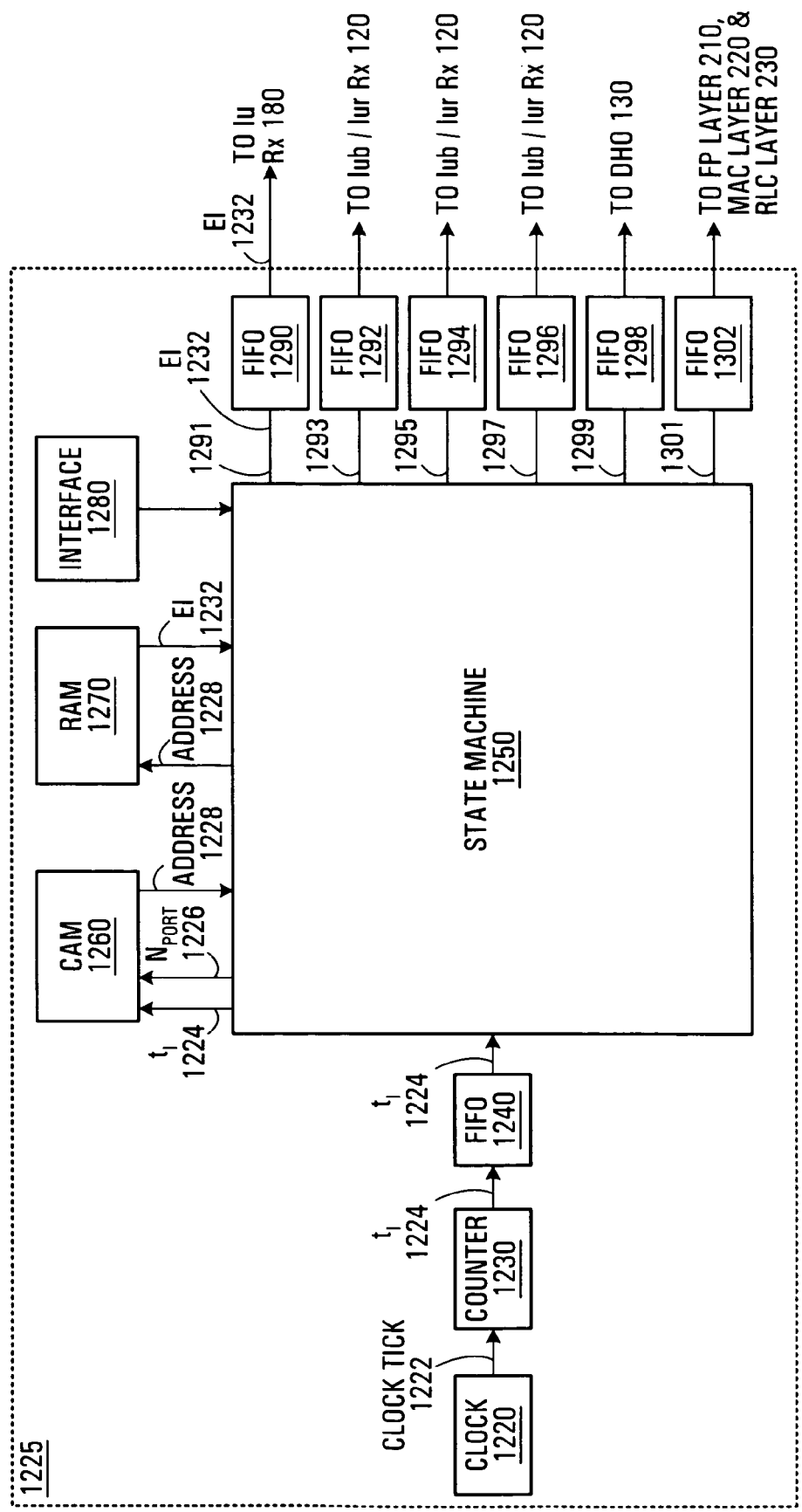
FIG. 14 is a block diagram of an event scheduler for processing engines of the off-load engine of FIG. 4, according to another embodiment of the invention.

Referring to FIG. 14, shown is a block diagram of an event scheduler 1225 for processing engines of the off-load engine 400 of FIG. 4, according to another embodiment of the invention. The scheduler 1225 has a state machine 1250 that interfaces with a CAM (Content Addressable Memory) 1260, a RAM (Random Accessible Memory) 1270, an interface 1280, and a FIFO (First In, First Out) buffer 1240. The state machine 1250 has ports 1291, 1293, 1295, 1297, 1299, and 1301 to which FIFO buffers 1290, 1292, 1294, 1296, 1298, and 1302 are connected. The scheduler 1225 also has a clock 1220 and a counter 1230 connected to FIFO buffer 1240. While the scheduling of processing is preferably implemented in hardware as a state machine, other hardware implementations are possible.

The clock 1220 outputs a clock tick 1222, to a counter 1230 at, for example, every 125 µs. For every clock tick received, the counter is incremented and outputs a time index, $t_I$, 1224 to a FIFO (First In, First Out) 1240 which stores the time index, $t_I$, 1224 in queue with previously stored time indexes. Each time index, $t_I$, 1224 corresponds to a respective time. The time index, $t_I$, 1224 is sequentially output from the FIFO 1240 to the state machine 1250 and provides a prompt having a specified time to the state machine 1250 for determining which events, if any, are to be reported to the processing engines of the off-load engine 400 of FIG. 4 (for example, processing engines corresponding to Iu Rx 180, Iub/Iur Rx 120, DHO 130, FP layer 210, MAC layer 220, and RLC layer 230). Upon receipt of the time index, $t_i$, 1224 the state machine 1250 cycles through ports 1291, 1293, 1295, 1297, 1299, 1301 and for each port looks up scheduled events to report using the CAM 1260 and the RAM 1270. To achieve this, the state machine 1250 outputs a number to the CAM 1260 which includes the time index $t_I$ 1224 and a port number $N_{port}$ 1226. The CAM 1228 returns an address 1228, which is then input into the RAM 1270 by the state machine 1250. The RAM 1230 returns event information, EI, 1232 and the state machine 1250 outputs the event information, EI, 1232 through one of the ports 1291, 1293, 1295, 1297, 1299, 1301 being cycled through for temporary storage in queue in a respective one of FIFOs 1290, 1292, 1294, 1296, 1298, 1302. Each of the FIFOs 1290, 1292, 1294, 1296, 1298, 1302 then forwards the event information it holds to a respective engine. For example, in FIG. 14, the event information, EI, 1232 is shown being output from port 1291 and FIFO 1290. FIFO 1290 contains event information for Iu Rx 180. FIFOs 1292, 1294, 1296 contain event information for Iub/Iur Rx 120; however, each one of FIFOs 1292, 1294, 1296 is dedicated to a respective channel type corresponding to Iub/Iur DCH, Iub CCH, and Iur CCH, respectively. FIFO 1298 contains event information for DHO 130. Finally, FIFO 1302 contains event information for FP layer 210, MAC layer 220, and RLC layer 230.

An interface 1280 provides instructions to the state machine 1250 for adding entries into the CAM 1260 for new events to be scheduled. The invention is not limited to the arrangement and number of FIFOs 1290, 1292, 1294, 1296, 1298, 1302 shown in FIG. 14 and in other embodiments of the invention one or more FIFOs are used to output event information to processing engines. Furthermore, for example, in some embodiments of the invention separate FIFOs are used to report event information to the FP layer 210, the MAC layer 220, and the RLC layer 230, and a single FIFO is used to report event information to the Iub/Iur Rx 180.

Figure 15:
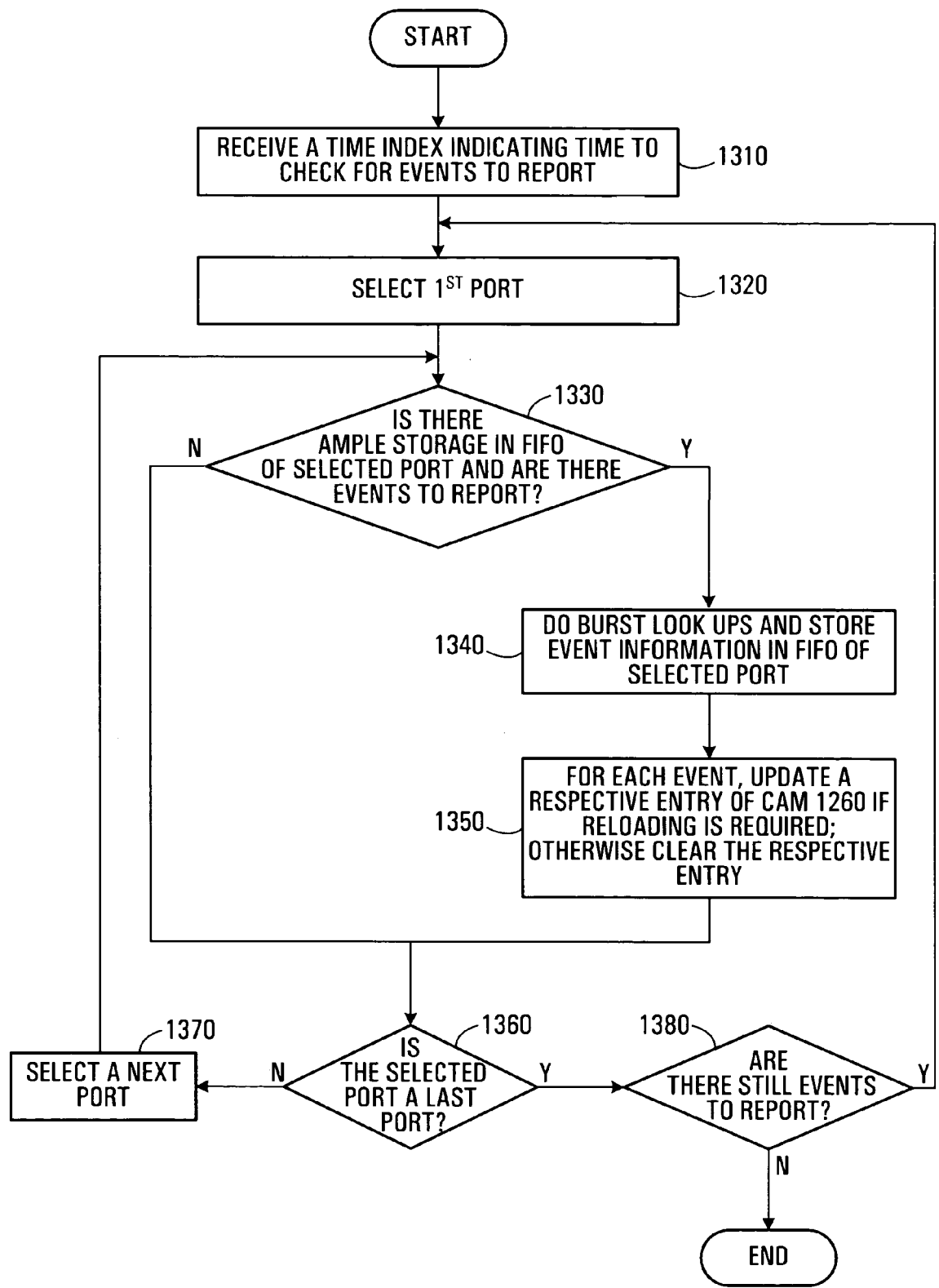
FIG. 15 is a flow chart of a method used by a state machine of the scheduler of FIG. 14 to report events to processing engines.

Referring to FIG. 15, shown is a flow chart of a method used by the state machine 1250 of the scheduler 1225 of FIG. 12 to report events to processing engines. At step 1310, the state machine 1250 receives the time index $t_I$ 1224 from the FIFO 1240 indicating it is time to check for events to report. At step 1320, a first port corresponding to port 1291 is selected. At step 1330, if there is ample storage space in a FIFO corresponding to the selected port (FIFOs 1290, 1292, 1294, 1296, 1298, 1302 correspond to ports 1291, 1293, 1295, 1297, 1299, 1301, respectively) and there are events to report, burst look ups in the CAM 1260 and RAM 1270 are performed by the state machine 1250 to extract the event information, EI, 1232 for the selected port and store the event information in the corresponding FIFO (step 1340). Whether a FIFO has ample storage space depends on how much memory is being used. For example in implementations in hardware, a FIFO might be considered to have ample storage space if 10% or more of its memory is available, and in implementations in software, a FIFO might be considered to have ample storage space if 30% or more of its memory is available; however, the invention is not limited to these percentages and in other embodiments of the invention other percentages are used. The event information, EI, 1232 is accessed by the state machine 1250 using a look up in the CAM 1260 with the time index, $t_I$, 1224 and the number, $N_{port}$, 1226 corresponding to the selected port as input. For a burst look up, the CAM 1260 returns a plurality of the addresses 1228 each corresponding to a scheduled event for the selected port. The state machine 1250 uses these addresses 1228 as inputs to the RAM 170 which returns the event information, EI, 1232 for each look up. At step 1340 the burst look ups continue as long as there is memory available for storage in the FIFO in which the event information is being stored and as long as there is event information to be stored. For each look up, the EI 1232 returned by the RAM 1270 is a number (for example, a 64-bit number) which contains event information for a particular event. For example, in one case the event information includes any one or more of the entity ID 615, the CFN 450, the DCH index, $DCH_I$, 697, the transfer block index, $TB_I$, 698, and the number of TBs, $N_{TB}$ 685. For example, for DHO in the embodiment of FIGS. 8 and 14, the entity ID 615 and the CFN 450 is used for combining data frames in DHO. In some cases the information is used to retrieve TBs from the TB store RAM 680 of FIG. 8, for example, for DHO. As an illustrative example, in one embodiment of the invention the entity ID 615, the CFN 450, the DCH index, $DCH_I$, 697, the transfer block index, $TB_I$, 698, and the number of TBs, $N_{TB}$ 685 occupy 20, 8, 5, 6, and 6 bits of the 64-bit number EI 1232 returned by RAM 1270. The remaining 19 bits of the 64-bit number EI 1232 are occupied by reload information. In particular, in some embodiments, some events require to be repeated at periodic intervals and in such cases the CAM 1260 needs to be updated for a next event. As such one of the remaining 19 bits of the 64-bit number corresponding to the event information EI 1232 indicates whether the event is periodic and 18 bits are used to indicate a time interval for a next event. As such, at step 1350, for each event looked up, a respective entry of the CAM 1260 is updated if reloading is required; otherwise a respective existing entry in the CAM 1260 is cleared. At step 1360, if the selected port is not a last port (port 1299), a next port is selected (step 1370) and steps 1330, 1340, 1350, and 1360 are repeated. At step 1360, if the selected port is a last port there may still be events to report, for example, because at step 1340 a FIFO was completely filled and no more event information could be stored. Therefore, at step 1380, if there are still events to report steps 1320, 1330, 1340, 1350, 1360, 1370, and 1380 are repeated until all events are reported. In this way, when memory in a FIFO is low other FIFOs are allowed to be filled with event information without having to wait until memory in the FIFO is freed-up thereby preventing head of line blocking.

In some embodiments of the invention there is no CAM 1260 and the state machine 1250 looks up the RAM 1270 without the use of the CAM 1260; however, at any one specified time there may be only few events to report from a large number of possible events. The events to report at any one specified time are therefore sparsely populated and this is well-suited for the CAM 1260 in making efficient use of memory. Furthermore, in some embodiments of the invention, the state machine 1250 is replaced with a processor implemented in software; however, the use of a state machine provided speed up in processing.

Figure 16A:
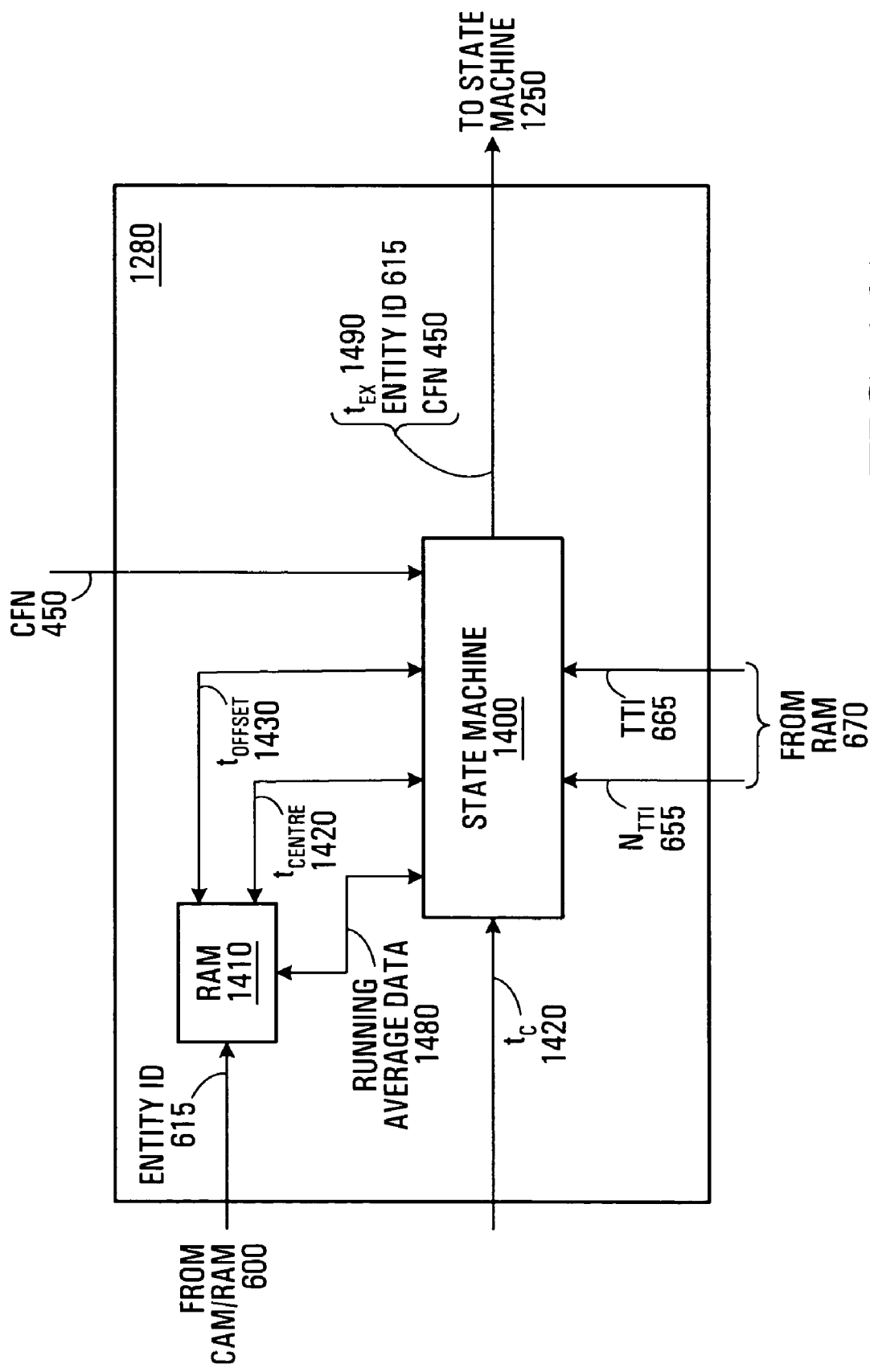
FIG. 16A is a block diagram of a portion of an interface of the scheduler of FIG. 14 used to provide instructions for DHO events to the state machine of FIG. 14.
Figure 16B:
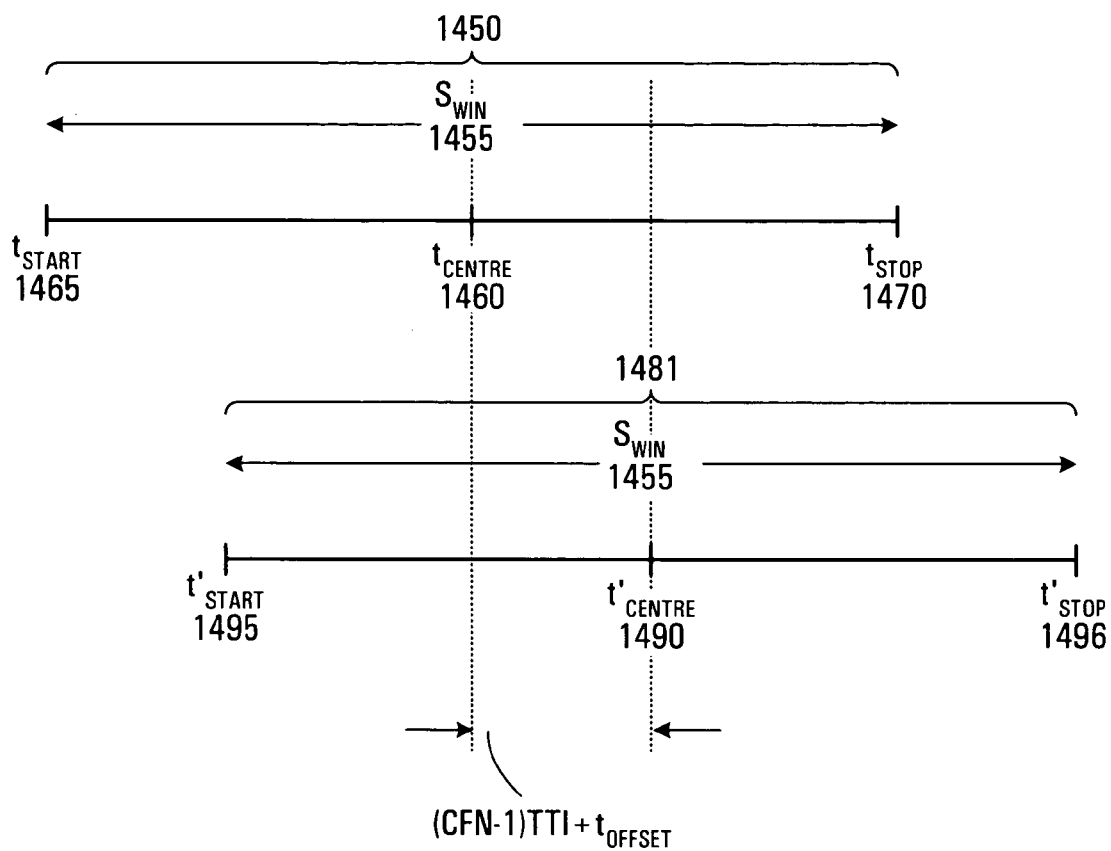
FIG. 16B is a diagram of a window in time for collecting data frames for the DHO events of FIG. 16A.

As discussed above with reference to FIG. 14, the interface 1280 is used to provide instructions to the state machine 1250 for updating the CAM 1260 and the RAM 1270 with event information. Referring to FIG. 16A, shown is a block diagram of a portion of the interface 1280 of the scheduler 1225 of FIG. 14 used to provide instructions for DHO events to the state machine 1250 of FIG. 14. The interface 1280 has a state machine 1400 and a RAM 1410. In order to determine when to next examine a received data frame for performing a DHO calculation and obtain a combined data frame, an extraction time, $t_{ex}$, 1490 is calculated. In particular, a current time of arrival, $t_{i,cta}$ (i=1 to N where N is an integer) of an $i^{th}$ received data frame depends on many factors and there can be significant variations from one data frame to another. To ensure that only properly timed data frames are used in obtaining a combined data frame, an acceptance window in time is created for each connection and for each set of data frames having similar CFNs. For example, in embodiments in which received data frames are buffered for a later DHO calculation to obtain a combined data frame, a window 1450 in time for collecting received data frames to be used in obtaining the combined data frame is defined as shown in FIG. 16B. To do so, the state machine 1400 inputs the number, $N_{TTI}$, 655 and the TTI 665 of a received data frame from RAM 670 of the parsing engine 606 of FIG. 8. The TTI 665 indicates a transmit time interval of a respective TB and the number, $N_{TTI}$, 655 is used together with the TTI 665 to calculate a window size, $S_{win}$, 1455 of the window 1450. The window size, $S_{win}$, 1455 is given by $$S_{win} = N_{TTI} \times TTI \qquad (1)$$

and is calculated by the state machine 1400. In some cases, the state machine 1400 is responsible for scheduling several DHO calculations. As such many windows in time may have to be calculated. The interface 1280 therefore inputs the entity ID 615 to identify a connection associated with a received data frame and inputs the CFN 450 to identify a sequence number of the received data frame. In this way, the state machine 1400 calculates a window in time for each one of a plurality of sets of data frames with each set of data frames having the same values for the entity ID 615 and the CFN 450.

For each connection, if the received data frame is a first received data frame, a center of the window, $t_{center}$, is set by a current time of arrival, $t_{1,cta}$, of the first data frame where $t_{center} = t_{1,cta}$. The current time of arrival, $t_{1,cta}$, of the first data frame is determined from a clock (not shown) which outputs a current time, $t_c$, 1420 to the state machine 1400. With $t_{center}$ 1560 and the window size, $S_{win}$, 1455, the window 1450 for collecting data frames is defined by a start time, $t_{start}$, 1465 and a stop time, $t_{stop}$, 1470 which are given by $$t_{start} = t_{1,cta} - S_{win}/2 + t_{offset} \quad (2)$$

and $$t_{stop} = t_{1,cta} + S_{win}/2 + t_{offset}, \quad (3)$$

respectively, where initially, for the first data frame an offset time, $t_{offset}$, 1430 is set to zero. The extraction time, $t_{ex}$, 1490 corresponds to the stop time, $t_{stop}$, 1470. Once the extraction time, $t_{ex}$, 1490 is calculated the state machine forwards the extraction time, $t_{ex}$, 1490, the entity ID 615, and the CFN 450 to the state machine 1250 of the scheduler 1225 for updating the CAM 1260 and the RAM 1270. The state machine 1400 then stores the offset time, $t_{offset}$, 1430 and the time, $t_{center}$, 1420 in the RAM 1410 using the entity ID 615 for addressing the RAM 1410.

Data frames from the same connection but having different values for the CFN 450 are expected to arrive at different times. As such, if a received data frame is not a first received data frame for the connection but is a first data frame having a new value for the CFN 450, the state machine looks up the RAM 1410 to retrieve the time, $t_{center}$, 1420 and the offset time, $t_{offset}$ 11430, and calculates a new window 1481 for data frames having the new value for the CFN 450. The window 1481 has the same window size, $S_{win}$, 1455 but a new center, $t'_{center}$ 1490 given by $t'_{center} = t_{center} + (CFN-1)TTI$. The state machine 1400 also calculates a new start time, $t'_{start}$, 1495 and a new stop time, $t'_{stop}$, 1496 which are given by $$t'_{start} = t'_{center} - S_{win}/2 + t_{offset} \quad (4)$$

and $$t'_{stop} t'_{center} + S_{win}/2 + t_{offset'} \quad (5)$$

respectively. A new value for the extraction time, $t_{ex}$, 1490 corresponds to the new stop time, $t'_{stop}$, 1496. The state machine then forwards the new value for the extraction time, $t_{ex}$, 1490, the entity ID 615, and the CFN 450 to the state machine 1250 of the scheduler 1225 for updating the CAM 1260 and the RAM 1270.

For a particular connection (or equivalently, for a particular value of the entity ID 615), an average latency of the received data frames may vary in time. As such, to account for a long term drift of windows a running average, $t_{run}$, is calculated by the state machine 1400 for each connection. For each connection, data frames which are received within their respective window in time (for example window 1450 or 1481), the state machine 1400 calculates a new value for the running average, $t_{run}$, which is given by $$t_{run} = \sum_{i=1}^{N} \frac{(t_{i,cta} - t_{i,center})}{N} \quad (6)$$

where $t_{i,center}$ is a center of a respective window of the $i^{th}$ received data frame.

After each calculation of the running average, $t_{run}$, if the running average, $t_{run}$, exceeds a maximum specified time, $t_{max}$, the offset time, $t_{offset}$, 1430 is adjusted and stored in the RAM 1410 to compensate for window drift due to time varying latency.

To keep track of the running average, $t_{run}$, the state machine 1400 stores running average data 1480 corresponding to $$\sum_{i=1}^{N} (t_{i,cta} - t_{i,center}) \text{ and } N,$$

in the RAM 1410 after each calculation of the running average, $t_{run}$, and retrieves the running average data 1480 prior to each calculation of the running average, $t_{run}$, to continue the calculation.

The invention is not limited to one state machine and one RAM for the interface 1280 of FIG. 16A. More generally in other embodiments of the invention, the functionality of the state machine 1400 is provided by one or more processors implemented in software or preferably in hardware for example as state machines. Furthermore, in some embodiments of the invention one or more memories are used as part of the interface 1280 for storing information accessible by the processors. In the embodiment of FIG. 16A, the interface 1280 is responsible for providing instruction for DHO events; however, it is to be understood that in some embodiments of the invention the interface provides instructions for any events required to be reported processing engines for which a time for the event can be determined.

Numerous modifications and variations of the present invention are possible in light of the above teachings. It is therefore to be understood that within the scope of the appended claims, the invention may be practised otherwise than as specifically described herein.

We claim:

1. A method of processing data frames, the method comprising for each data frame:
    determining a determined processing path of a plurality of processing paths in which the data frame is to be processed, the plurality of processing paths comprising a generic processing path and at least one data frame type specific path; and
    processing the data frame according to the determined processing path using one or more processing engines associated with the determined processing path,
    wherein data frames of a specific data frame type are processed on a data frame type specific path associated with the specific data frame type, and data frames of a non-specific data frame type are processed on the generic processing path;
    wherein each data frame has associated with the data frame a transport layer address, the method further comprising for each data frame:
    determining which processing path of the plurality of processing paths the data frame is to be processed using the transport layer address associated with the data frame,
    wherein for each data frame the determining which processing path of the plurality of processing paths the data frame is to be processed using the transport layer address associated with the data frame comprises using at least one memory looking up one of the plurality of processing paths using the transport layer address associated with the data frame;
    wherein for each data frame looking up one of the plurality of processing paths using the transport layer address associated with the data frame comprises looking up a path identifier of the determined processing path using the transport layer address associated with the data frame, and wherein each data frame has a connection established for transmission of the data frame, each connection being established for transmission of at least one data frame of the data frames with the at least one data frame having a processing path of the plurality of processing paths that is to process the at least one data frame, the method further comprising for each connection:

storing in a RAM (Random Addressable Memory) in a location in the RAM the path identifier of the processing path that is to process the at least one data frame for which the connection is established, the location having an address; and storing in a CAM (Content Addressable Memory) the address of the location in the RAM in a location associated with the transport layer address of the at least one data frame for which the connection is established; and wherein for each data frame of the data frames, the method further comprising looking up the CAM using the transport layer address associated with the data frame to obtain the address of the location in the RAM of the path identifier of the processing path that is to process the data frame and looking up the RAM using the address of the location in the RAM of the path identifier of the processing path that is to process the data frame for obtaining from the RAM the path identifier of the processing path that is to process the data frame.

2. In an apparatus having a plurality of processing engines, a method of processing data frames, the method comprising for each data frame:

determining which processing engines of the plurality of processing engines are to process the data frame, the plurality of processing engines comprising a generic processing engine and at least one data frame type specific processing engine;

processing the data frame using the processing engines that are to process the data frame;

wherein data frames of a specific data frame type are processed by a data frame type specific processing engine associated with that data frame type, and data frames of a non-specific data frame type are processed by the generic processing engine;

wherein the method comprises, for each data frame:

scheduling the data frame for processing by the processing engines that are to process the data frame; and processing the data frame comprising processing the data frame according to the scheduling;

wherein each data frame is associated with a transport layer address, the method further comprising storing processing information to allow for each data frame a determination of which processing engines of the plurality of processing engines are to process the data frame on the basis of the transport layer address associated with the data frame;

wherein each data frame has a connection established for transmission of the data frame, each connection being established for transmission of at least one data frame of the data frames with the at least one data frame having processing engines of the plurality of processing engines that are to process the at least one data frame, the method further comprising for each connection:

storing in a RAM (Random Addressable Memory) in a location in the RAM an identifier of the processing engines that are to process the at least one data frame for which the connection is established, the location having an address; and storing in a CAM (Content Addressable Memory) the address of the location in the RAM in a location associated with the transport layer address of the at least one data frame for which the connection is established; and wherein for each data frame of the data frames, the method further comprising looking up the CAM using the transport layer address associated with the data frame to obtain the address of the location in the RAM of the identifier of the processing engines that are to process the data frame and looking up the RAM using the address of the location in the RAM of the identifier of the processing engines that are to process the data frame for obtaining from the RAM the identifier of the processing engine that are to process the data frame.

3. In an apparatus having a plurality of processing engines, a method of processing data frames, the method comprising for each data frame:

determining which processing engines of the plurality of processing engines are to process the data frame, the plurality of processing engines comprising a generic processing engine and at least one data frame type specific processing engine;

processing the data frame using the processing engines that are to process the data frame;

wherein data frames of a specific data frame type are processed by a data frame type specific processing engine associated with that data frame type, and data frames of a non-specific data frame type are processed by the generic processing engine;

the method further comprising for each data frame;

scheduling the data frame for processing by the processing engines that are to process the data frame; and processing the data frame comprising processing the data frame according to the scheduling, and wherein for each data frame the scheduling comprises:

with respect to event information, scheduling an event for processing the data frame by a processing engine of the processing engines that are to process the data frame by:

storing the event information in a location in a RAM (Random Access Memory), the location having an address;

determining a time at which the event is to take place; and storing the address in a CAM (Content Addressable Memory) in a location associated with the time.

* * * * *